(12) United States Patent
Steenblik et al.

(10) Patent No.: US 7,006,294 B2
(45) Date of Patent: Feb. 28, 2006

(54) MICRO-OPTICS FOR ARTICLE IDENTIFICATION

(75) Inventors: Richard A. Steenblik, Alpharetta, GA (US); Mark J. Hurt, Duluth, GA (US); Michael E. Knotts, Roswell, GA (US)

(73) Assignee: Nanoventions, Inc., Roswell, GA (US)

( * ) Notice: Subject to any disclaimer, the term of this patent is extended or adjusted under 35 U.S.C. 154(b) by 0 days.

(21) Appl. No.: 10/351,285

(22) Filed: Jan. 24, 2003

(65) Prior Publication Data

US 2003/0179364 A1    Sep. 25, 2003

Related U.S. Application Data

(60) Provisional application No. 60/352,000, filed on Jan. 24, 2002, provisional application No. 60/351,853, filed on Jan. 24, 2002.

(51) Int. Cl.
*G02B 27/10* (2006.01)
*G09C 3/00* (2006.01)
(52) U.S. Cl. .......................... 359/619; 380/54
(58) Field of Classification Search ............... 359/619, 359/620, 623, 626–627, 707, 710, 2; 380/54, 380/55
See application file for complete search history.

(56) References Cited

U.S. PATENT DOCUMENTS

| | | | | |
|---|---|---|---|---|
| 4,498,736 A | * | 2/1985 | Griffin | 380/54 |
| 4,645,301 A | * | 2/1987 | Orensteen et al. | 380/54 |
| 5,303,370 A | * | 4/1994 | Brosh et al. | 380/54 |
| 2002/0172360 A1 | * | 11/2002 | Matos | 380/54 |
| 2003/0058491 A1 | * | 3/2003 | Holmes et al. | 359/2 |
| 2003/0067389 A1 | * | 4/2003 | Look | 359/537 |

* cited by examiner

*Primary Examiner*—Georgia Epps
*Assistant Examiner*—Alicia M. Harrington
(74) *Attorney, Agent, or Firm*—Todd Deveau; Thomas, Kayden, Horstemeyer & Risley, LLP

(57) ABSTRACT

The present invention provides methods and compositions for authentication of articles and counterfeit deterrence using non-holographic micro-optics and microstructures having a surface relief greater than a few microns. Embodiments of the present invention disclose a range of distinctive optical effects obtained from micro-optic systems incorporating micro lenses, non-imaging collectors, prisms, wave guides, mirrors, gratings, structural interference filters, and photonic crystal microstructures.

47 Claims, 28 Drawing Sheets

MICRO-OPTICS FOR ARTICLE IDENTIFICATION

CROSS REFERENCE TO RELATED APPLICATIONS

This application claims priority to and benefit of both U.S. provisional application No. 60/351,853 filed on Jan. 24, 2002, and to U.S. provisional application No. 60/352,000 filed on Jan. 24, 2002, both of which are incorporated by reference in their entirety.

BACKGROUND OF THE INVENTION

1. Field of the Invention

The present invention relates generally to optical security devices, more particularly to optical security devices and identification for articles, and particularly, documents and financial instruments.

2. Related Art

Surface relief holograms, also known as embossed holograms, have been utilized to authenticate financial instruments and high value products for many years. The security provided by embossed holograms is limited by their low surface relief, typically 0.25 micron, which makes them susceptible to counterfeiting: stripping the hologram from the substrate exposes the complete holographic microstructure which can be easily used to create counterfeit tooling.

Stripping the hologram from the substrate is effective regardless of the optical complexity of the hologram. Limited protection from physical replication has been achieved by patterned metallization and the use of frangible materials, but these approaches do not prevent holographic copying methods. Although photopolymer 'volumetric' holograms are not susceptible to physical counterfeiting methods, they can be copied holographically. Moreover, photopolymer holograms also suffer from high production and application costs and small worldwide production capacity.

Therefore, there is a need for compositions and methods for authenticating or identifying articles including identifying reproductions.

SUMMARY OF THE INVENTION

The present invention provides methods and compositions for authentication or identification of articles and counterfeit deterrence using non-holographic micro-optics and microstructures. The micro-optics of the present invention can be single layer, multilayer, and any geometrical shape depending on the desired optical effect. One aspect provides a micro-optically labeled article having a plurality of micro-optic structures positioned in a specified pattern on a surface to display identifying optical information. This invention has particular application to financial instruments including but not limited to currency or documents, but is not limited thereto.

Micro-optics used to authenticate or identify articles can incorporate both geometrical and diffractive optics. Additionally, the micro-optics can produce an image using optical methods wherein the image produced is not a projection of a pigmented or inked image. Additional aspects provide micro-optics that form images independent of illumination angle and/or without a printed template image.

Another aspect of the present invention provides an article having at least one micro-optic structure composed of a polymer having a first and second surface, wherein said first surface comprises a plurality of cylindrical lenses; and wherein the second surface comprises a curved reflective surface and a light absorptive surface. Alternatively, the micro-optics can include reflective optical elements having an effective radius of curvature to reflect light into a specified viewing area.

Still another aspect of the present invention includes a plurality of tapered structures wherein said tapered structures are covered with a reflective material such that light is reflected among the tapered structures until substantially all of the reflected light has been absorbed. These micro-optics have the effect of producing a black zone or cone of darkness that can be used with or without reflective optics to form an image. The reflective optics can include a reflective material, for example a metal include but are not limited to aluminum, silver, gold, chrome, titanium, and nickel.

Yet another aspect of the invention provides an article having micro-optics on at least one surface such that reflected light is directed away from the axis perpendicular to the at least one surface. Directing reflected light in this manner reduces the quality of a reproduction, for example a photocopy, because the photocopy device is unable to capture enough of the reflected light to faithfully reproduce the original.

Methods for identifying original articles and differentiating between reproductions and originals base on the content and quality of images formed using micro-optics described herein are also provided. The methods can employ single layer or multilayer micro-optics or a combination thereof.

DETAILED DESCRIPTION OF THE INVENTION

Figure 1:
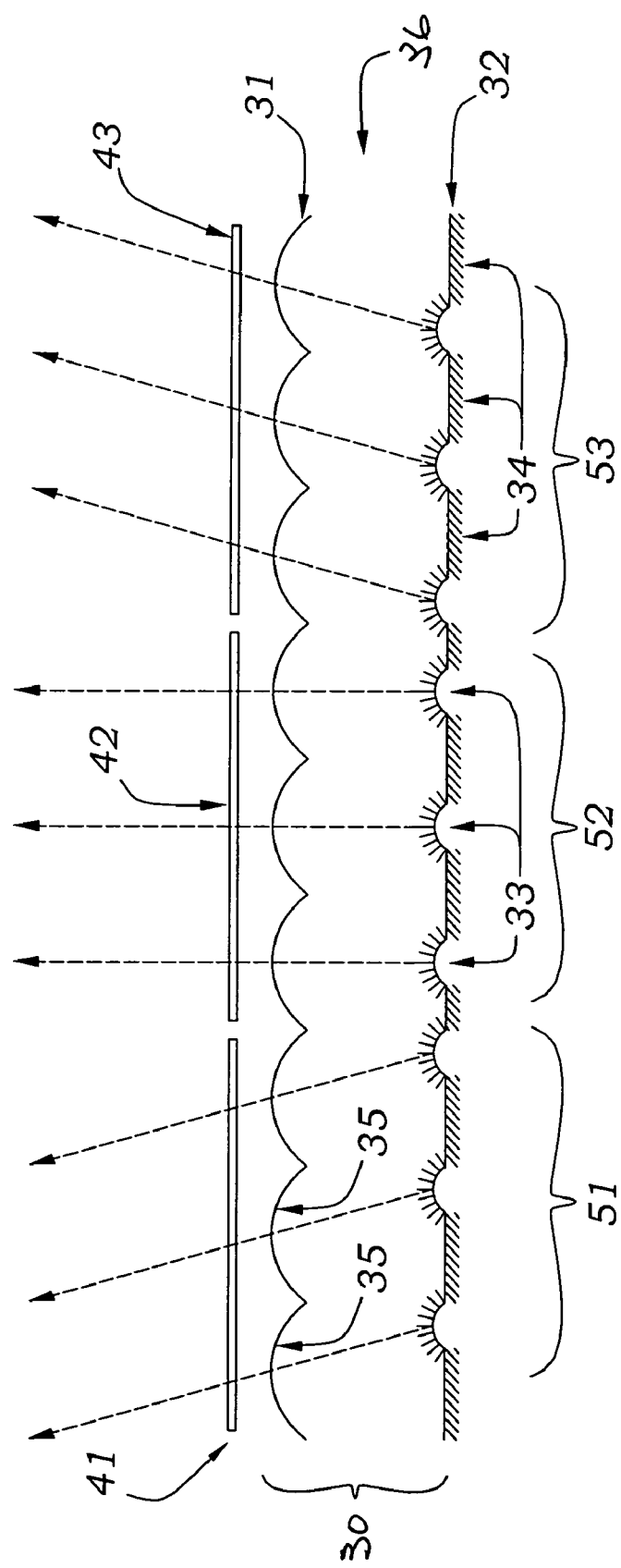
FIG. 1 is a cross-sectional view of a first embodiment according to the present invention including three image elements.

The present invention provides methods and compositions for authentication or identification of articles and counterfeit deterrence using non-holographic micro-optics and microstructures, for example microstructures having a surface relief greater than 3 microns, typically greater than 1 micron. Microstructures, also referred to as micro-optics, are structures less than 200 $\mu$m in width which incorporate geometrical optics, diffractive optics, or a combination thereof to form an image when illuminated. The micro-optics of the present invention can be single layer, multi-layer, and any geometrical shape depending on the desired optical effect. Because different geometric shapes confer different optical properties to the microstructures, a particular geometric shape for a micro-optic system can be selected based on the optical properties required. Suitable geometric shapes include but are not limited to domes, hemispheres, hexagons, squares, cones, pyramids, stepped structures, cubes, or combinations thereof. It will be appreciated that the micro-optics can be convex or concave, or in recess or relief on a surface or a combination thereof.

By the selection and arrangement of a plurality of micro-optics which comprise the present invention, one can create identifying and or authenticating information in relation to a given article with which such optics are associated on a nano-scale. Embodiments of the present invention disclose a range of distinctive optical effects obtained from micro-optic systems incorporating micro lenses, non-imaging collectors, prisms, wave guides, mirrors, gratings, structural interference filters, and photonic crystal microstructures for providing said identifying and or authenticating information. Many of the possible optical effects, such as optical interactions between discrete elements, cannot be effectively simulated by any other means, including holography. Exemplary microstructures of the present invention cannot be faithfully reproduced using conventional holographic reproduction processes.

Still other embodiments provide compositions and methods for embedding the optical microstructures inside a substrate, entirely eliminating the optical surface relief from which a mechanical copy might be made. The enhanced security of embedded micro-optic document authentication devices depends on effective prevention of delamination. Delamination can be prevented or reduced by embedding the micro-optics into a substrate. Exemplary substrates with embedded microstructures utilize interlayer bonding of fabrication materials to prevent or reduce the ability of separating the microstructures into their constituent layers by mechanical, thermal, or chemical means. One embodiment provides microstructures having optical elements produced from at least two polymers which have similar base chemistry but different refractive index. The interlayer bonding of these chemically similar, but optically different, materials is as strong as the base polymer of the substrate, preventing the microstructures from being separated into their constituent layers by mechanical, thermal, or chemical means.

Other embodiments of the present invention provide counterfeit-resistant document authentication by providing: unique visual or optical effect, ease of incorporation into a document, high counterfeit deterrence value, and low cost. Easily handled documents typically have a thickness in the range of 50 to 150 microns. One embodiment of the present invention provides micro-optic films designed to have a thickness as small as a few microns, similar to hot-stamped holographic foils. Other embodiments provide micro-optics incorporated directly into the document substrate, utilizing the optical thickness of the substrate to provide separation between optical elements.

Yet another embodiment of the present invention provides micro-optics incorporating refractive, reflective, focusing, light absorbing, diffractive, or color selection microstructures or a combination thereof which are manufactured to specific tolerances. Typical dimensions and tolerances required for successful replication are well outside the capabilities of common holographic reproduction methods, rendering these micro-optic systems highly resistant to counterfeiting by commonly available means.

Surface relief holograms are typically only 0.25 micron deep, while exemplary geometrical optics of the present invention range from about 1 micron to about 50 microns and perform optical functions that cannot be obtained with devices incorporating only diffractive optics or iridescent effects. Direct attempts at mechanically counterfeiting the micro-optics described herein can result in variations in dimension, geometrical distortion, changes in scale, variations in refractive index, deviations of coating thickness, degradation of surface properties, misalignment of optical elements, or other deviations from the original micro-optic which seriously degrade or destroy the optical function of the counterfeit. Additional counterfeit deterrence is obtained by embedding the disclosed optical microstructures inside the substrate, entirely eliminating the optical surface relief from which a mechanical copy might be made. Re-origination of the micro-optic systems of the present invention is an even greater challenge to counterfeiting. Origination of the types of the disclosed micro-optics requires a sophisticated microfabrication laboratory, highly skilled technicians, and a wealth of know-how. One embodiment provides systems incorporating illumination-angle independent optically variable effects that cannot be simulated by print or by holographic optics.

Without being bound to one theory, it is believed that embodiments of the present invention operate on light through principles of both geometrical optics (modeling light as rays) and diffractive optics (modeling light as waves). Macro-scale geometrical optical systems are essentially scale invariant: the function of the system does not change appreciably if it is scaled up or down. Micro-optic systems are scale variant because of the effects of diffraction.

The relative contributions of geometrical optic effects and diffractive optic effects depend on a large number of factors, including the size of the micro-optic elements in relation to the illumination wavelength. There is no hard transition from the geometrical regime to the diffractive regime. Large micro-optic elements, on the order of 100 microns, behave predominately as geometrical optics. The performance of optical elements smaller than 10 microns is dominated by diffractive effects. Optical elements in between these extremes exhibit a proportionate mix of properties.

If diffraction is ignored in the design of a micro-optic system, the actual system performance will usually be degraded from the intended performance. By using sophisticated optical design methods that properly consider its effects, diffraction can be converted from a limitation into an asset. One embodiment of the present invention optimizes the dimensions of micro-optics to use diffraction to enhance the overall system performance, and thereby add an additional degree of freedom to the design.

Micro-optic systems of the present invention incorporate refraction, reflection, or focusing properties to control light providing advantages over purely diffractive optic systems, including holograms. One excellent example is sensitivity to illumination angle. Exemplary micro-optic systems of the present invention can be easily designed which accept light from a wide range of angles but return light in a pattern which is independent of the illumination angle; holograms cannot provide illumination angle independent effects.

Surface relief holograms reconstruct a separate image for each point in the field of illumination. Each of these images appears displaced according to the relative angles of illumination and viewing and the depth of the image. Rainbow holograms will also present each image in different colors that vary according to the illumination and viewing angles. Surface relief holograms therefore appear most distinct when viewed under point source illumination, and least distinct when viewed under a broad field of illumination, such as overhead fluorescent lighting. This blurring effect can be reduced by minimizing the visual depth of the holographic image. This is not a good tradeoff, since the visual depth, or three-dimensionality, of holograms is their most compelling feature. This is taken to its limit in 2-D holograms, or pixelgrams, which are simply patterned diffraction gratings.

Volume or phase holograms show a different sensitivity to illumination angle. Like surface relief holograms, they show multiple image blur for illumination points that are distributed in a horizontal plane. Illumination points along a vertical plane will either fall into the range of angles suitable for reconstructing the hologram, or they will not. If the illumination angle is outside the acceptance range of a phase hologram no image will be formed. If the illumination angle is within the range an image will form and the color of the image will vary over a relatively small spectral range depending on the angle.

In contrast to holograms, if a micro-optic system includes interacting elements which have a physical separation, then the geometrical optic relationship between the elements can be designed to produce visual effects which are independent of illumination angle.

One embodiment of the present invention provides a micro-lenticular light control system. As shown schematically in FIG. 1, an exemplary polymer film micro-optic system incorporates a linear array of cylindrical lenses on its upper surface and a metallized light control pattern on the lower surface. Ambient illumination passing through the cylindrical lenses scatters from the 'white' zones of the lower surface and is absorbed by the dark zones of the pattern. Specifically designed zones reimage the illumination using short focal length negative curvature mirror surfaces, creating a virtual image just beneath the lower surface of the film. By virtue of the short focal length, the position of this virtual image is nearly constant, regardless of illumination angle. The cylindrical lenses form real images of the black and white zones to project a visual pattern which varies according to the angle of viewing but which is effectively insensitive to the angle of illumination. By providing a light control function which is independent of the illumination angle, micro-optic systems can provide consistent light control effects for document authentication or identification without the need for point-source lights or other specialized illumination such as holograms require.

In one embodiment, the micro-optic system produces black and white lines that are each created by the cooperation of sets of six adjacent cylindrical lenses projecting images of the underlying a black and white pattern, Each visible line is therefore as wide as six cylindrical lenses, or 150 microns (6 mil). The black/white parity of each line switches dynamically according to the viewing angle. Two neutral gray lines mark the change of phase: the alternating pattern of black lines on the left side become white lines on the light side of the phase transition. In this example the projected brightness of one million points of light per square inch is controlled.

The micro-optic systems disclosed herein can be used for a variety of light control functions. Because a typical micro-optics system is visually unique and not simulatable by holography or print, it can serve as a document authentication device without any additional modification. It can also be combined with an overprinted image to produce autostereoscopic 3-D images or motion images, somewhat akin to a black and white hologram that does not lose clarity under diffuse illumination. Alternatively, an underlying pattern can be customized to bear image information to achieve autostereoscopic 3-D, motion, and changing message functions without overprinting. The registered two-sided microstructure of the micro-optic systems and the high aspect ratio patterns it includes make this material essentially counterfeit-proof.

A. Exemplary Micro-optics Systems

Micro-optic systems and methods of producing them are known in the art. For example U.S. Pat. Nos. 5,359,454; 5,461,495; 5,475,533; 5,503,902; and 5,568,313 to Steenblik et al. all of which are incorporated by reference in their entirety as is if fully disclosed herein, disclose micro-optic systems and methods of their fabrication. Reference can be made to the disclosures of these patents for more detailed information on how to manufacture the various microstuctures which comprise the present invention.

1. Multi-Layer Micro-Optics

FIG. 1 illustrates the basic configuration and operation of an exemplary embodiment of the micro-optics systems of the present invention is shown. Briefly, the light control material 30 comprises a two-layer optical system separated by a refractive material 36. It is the two-layer optical system that allows the thickness of the device to be independent of the print size. In one embodiment of the present invention, the first layer comprises focusing optics 31 and is sometimes referred to as the "outer optic" (i.e., closest to the observer). The focusing optics 31 generally consist of an array of lens elements 35. The second layer contains light control optics 32 and is sometimes referred to as the "inner optic". The layer of light control optics 32 consists of a pattern of bright zones 33 disposed generally parallel to the axial direction of the focusing elements 35. The bright zones 33 are separated from each other by dark zones 34, which may be either light absorbing or light dispersing. The composition of the focusing optics 31 and the light control optics 32 will be discussed in detail below.

FIG. 1 also illustrates the cooperation of the focusing optics 31 and the light control optics 32 for light directional control. In FIG. 1 the light source (not shown) is located underneath the light control optics 32, and the light control material 30 is operating in a light transmissive mode. Three image elements (left image element 41, center image element 42, and right image element 43) are placed above the focusing optics 31. While FIG. 1 shows three image elements, the present invention is not limited to that number of image sets. The device will operate with as few as two sets of image elements (e.g., up/down or left/right) or with many more than that. Some applications which are not brightness sensitive could tolerate (and benefit from) a large number of image sets, such as four, five, or more. The relative positions of the image elements 41–43 and the focusing optics also is not important. The light directional control function may be performed with the image elements 41–43 placed either above the focusing optics 31 as shown in FIG. 1, in between the focusing optics 31 and the light control optics 32, or below the light control optics 32.

Assuming the device is operating with three sets of image elements, the light control material is divided into three image zones—a left image zone 51, a center image zone 52 and a right image zone 53. The center image zone 52 is formed by positioning the associated bright zones 33 directly below the center of the lens elements 35. Light passing through the center image zone 52 will be directed through the focusing optics 31 above it and transmitted through the center image element 42 as center directed light (this light may be intercepted by the observer's right eye). The left image zone 51 is formed by laterally shifting the position of the associated bright zones 33 to the right so that the center of the bright zones are no longer aligned with the center of the lens elements 35. Light passing through the left image zone 51 will then be directed through the left image element 41 and transmitted as left directed light (this light may be intercepted by the observer's left eye, forming a stereo pair with the center image zone light directed to the right eye). The right image zone 53 is similarly formed by laterally shifting the associated bright zones 33 to the left. Light passing through the right image zone 53 will be directed through the right image element 43 and transmitted as right directed light (if the observer's position shifts so that the center image light is intercepted by the observer's left eye, then the right directed light may be intercepted by the observer's right eye, forming a stereo pair).

The image elements 41–43 will generally be composed of transparent, colored print dots that serve to color the light but will not control the directions of visibility of the lenses depicted. The resulting system therefore enables an observer to perceive one set of image elements from one eye and a different set of image elements from the other eye, thereby creating the perception of autostereoscopic depth, motion or color change.

FIG. 1 shows three sets of lenses 35 for each image element for simplicity. However, the present invention need not be limited to this number. The number of lenses that are spanned by each image element will be a design variable, depending on the printing resolution, the width of the image elements, and the size of the lenses. The actual number of lenses devoted to a single image element can range from one lens to more than twenty. A typical number will be six to nine lenses per image element. The image elements do not necessarily have to cover the entire surface of the light control material. In general, each image element need only lie over its respective image zone, but the image elements do not have to be in perfect registration with the image zones. Also, the spacing between the image elements is not critical. Each image element does not have to be equally spaced from the edge of its respective image zone.

While FIG. 1 shows the bright zones in the center image zone 52 aligned directly beneath the center of the associated lens elements 35, this alignment is not critical to the performance of the invention. The actual position of the lens elements over the light control optics is not important. What is important is the pattern of the light control optics 32. The spacing of the bright zones is periodic in each image zone so that the period of the bright zones matches the period of the lens elements. As long as the lateral spacing of the light control optics is fixed and the lateral positioning of the focusing optics is fixed, the relative positions of the two layers is not important. This allows "slip" in the operation of the device and thus makes it easier to manufacture.

Viewed from above without any image elements, an observer looking at the light control material would see a set of very fine bright strips separated by very fine black strips. The relative width of the bright strips would depend on the pattern of the light control optics. With one eye, an observer would see one set of trips that are bright. The other eye would see a different set of strips that are bright. The set of strips that appear bright with the left eye will appear dark with the right eye, and vice versa. When the image elements are imposed onto the light control material, the observer is able to see one image element set with one eye and another image element set with the other eye, thus creating the perception of autostereoscopic depth, motion or color change.

Figure 2:
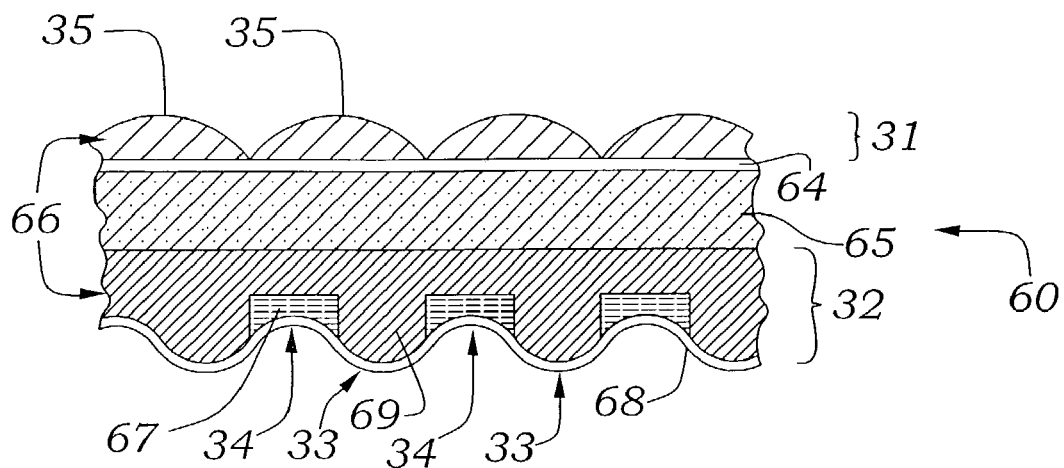
FIG. 2 is a cross-sectional view of the first embodiment of the present invention.

Referring now to FIG. 2, the details of the focusing and light control optics will be explained. The focusing optics 31 consists of an array of refractive cylindrical lenses 35. Alternatively, the focusing optics may consist of diffractive lenses, hybrid refractive/diffractive cylindrical lenses, or reflective focusing troughs of conventional geometry, diffractive form or hybrid form. These lenses 35 will generally be made from a photopolymer 66 or other photo-initiated acrylated epoxies. A preferred method for producing the focusing optics is by "soft" embossing the photopolymer 66 onto an optical substrate 65, i.e., casting the liquid plastic against a roller that has the desired geometry and allowing it to cure. While "soft embossing" is preferred, other methods may be used to produce the focusing optics. For example, "hard" embossing, i.e., impressing a soft, but not liquid, plastic against a roller that has the desired pattern, can also be used to obtain the same desired effect. Additional methods suitable for producing the focusing optics include injection molding, compression molding, extrusion, and casting. The soft embossing technique is preferred because it generally enables higher precision replication than hard embossing and it also reduces the amount of tool wear. The width of the individual lenses 35 in the focusing optics 31 is very small, generally falling in the range from 8 to 25 microns.

FIG. 2 is a small section of the light control material of the present invention, showing a single image element 64 positioned between the focusing optics 31 and the light control optics 32. As noted above, however, the invention also will produce the desired effects if the positions of the image element 64 and focusing optics 31 are reversed.

The photopolymer 66 is embossed onto a transparent optical substrate 65. This substrate will preferably be a polyester material, but other commercial plastic film materials such as polypropylene can also be used.

The second layer of the light control material 30 contains light control optics 32. The light control optics 32 are designed to provide directional control of the light passing out through the focusing optics 31 to the observer. The layer of light control optics 32 consists of a pattern of bright zones 33 separated from each other by dark zones 34. In general, the distance from one edge of one bright zone 33 to the corresponding edge of the next bright zone is the same as the width of one lens above it. In one preferred embodiment, the dark zones 34 are formed by applying an opaque material 67 onto those areas of a reflective surface 68 that are to absorb incident light. The opaque material 67 preferably comprises pigmented ink, but any light absorbing optical structure or light dispersing optical structure can also be used. Those zones of the reflective surface 68 not covered by the opaque material 67 form the bright zones 33 of the light control optics. Optionally, those areas that are to be bright zones 33 can also be formed by applying a diffractive, holographic, or diffusing pattern 69 on the bright zones of the light control optics. The reflective surface 68 conforms to diffractive, holographic, or diffusing pattern 69. The addition of a diffractive pattern 69 to the surface 68 serves to enhance the brightness of the bright zones 33 at chosen viewing angles. The light control optics 32 may be embossed with the same photopolymer 66 that is used to emboss the focusing optics 31. A preferred layer 68 consists of a layer of highly reflective metal, preferably aluminum.

Formation of the dark zones 34 in the light control optics 32 is not restricted to using an opaque material. For example, the dark zones 34 may also be formed by designing a field of cones or other geometric patterns in the substrate 68 which have the function of "capturing" incident light.

In the embodiment of FIG. 2, the light source (not shown) is above the focusing optics 31, and the invention will operate in a light reflective mode as compared to the light transmissive mode of the embodiment shown in FIG. 1.

Figure 3:
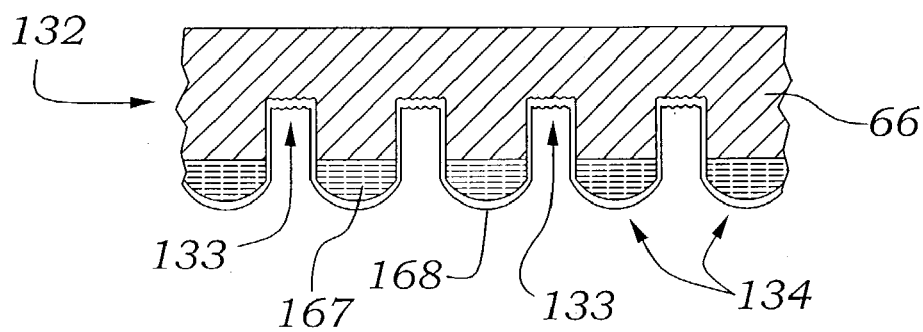
FIG. 3 shows a first alternative embodiment of the light control optics of the present invention.
Figure 4:
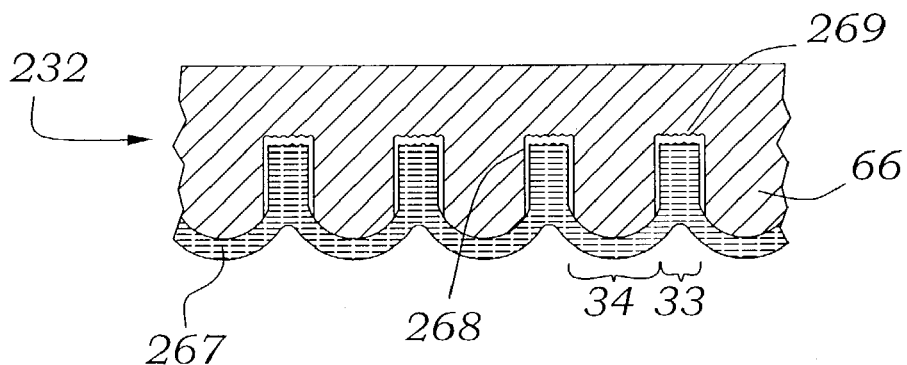
FIG. 4 shows a second alternative embodiment of the light control optics of the present invention.
Figure 5:
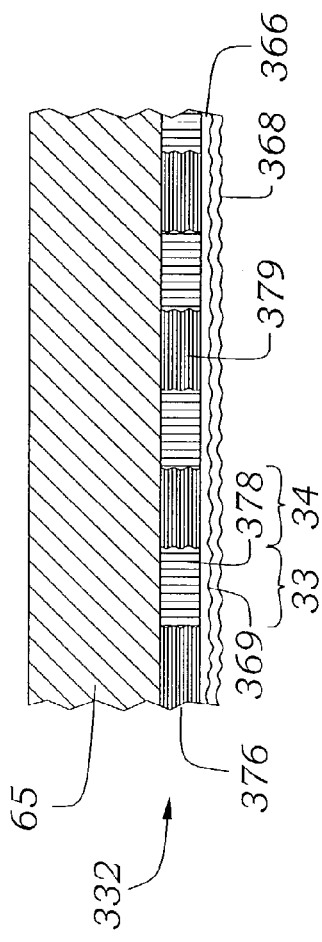
FIG. 5 shows a third alternative embodiment of the light control optics of the present invention.

While FIG. 2 shows one preferred embodiment of the invention, there are numerous alternative ways of designing the light control optics, as shown in FIGS. 3–5. FIG. 3 shows an alternative design in which the geometric pattern of the light control optics 132 is the reverse of that shown in the preferred embodiment. In other words, the bright zones in this embodiment are located in those areas where the dark zones were located in the first embodiment. In this embodiment, the dark zones 134 are formed in the recessed notches created in the reflective substrate 168 with an opaque material 167 and the bright zones 133 are formed in between. The relative positions of the dark zones and the bright zones along the light control optics are reversed from that of the embodiment shown in FIG. 2. In the embodiment of FIG. 3, the present invention will function in a light reflective mode due to the presence of the reflective layer 168.

FIG. 4 shows a second alternative design for the light control optics 232. In this design, the opaque material 267 is in effect the substrate. The bright zones 233 are shown with a reflective layer 268, preferably of aluminum, and a diffractive pattern 269. The bright zones 233 here are formed by covering selected portions of the opaque substrate with reflective layers 268.

FIG. 5 shows a third alternative design for the light control optics. In this embodiment, the light control optics 332 consist of a photographic emulsion layer 376. The bright zones are formed as transparent emulsion zones 378, and the dark zones are formed as opaque emulsion zones 379. A transparent material 366 (preferably a photopolymer) is layered below the photographic emulsion layer 376. Below the transparent material 366, a reflective layer 368 is applied to the diffractive pattern 369 so that the device will function as a reflective material.

Figure 6:
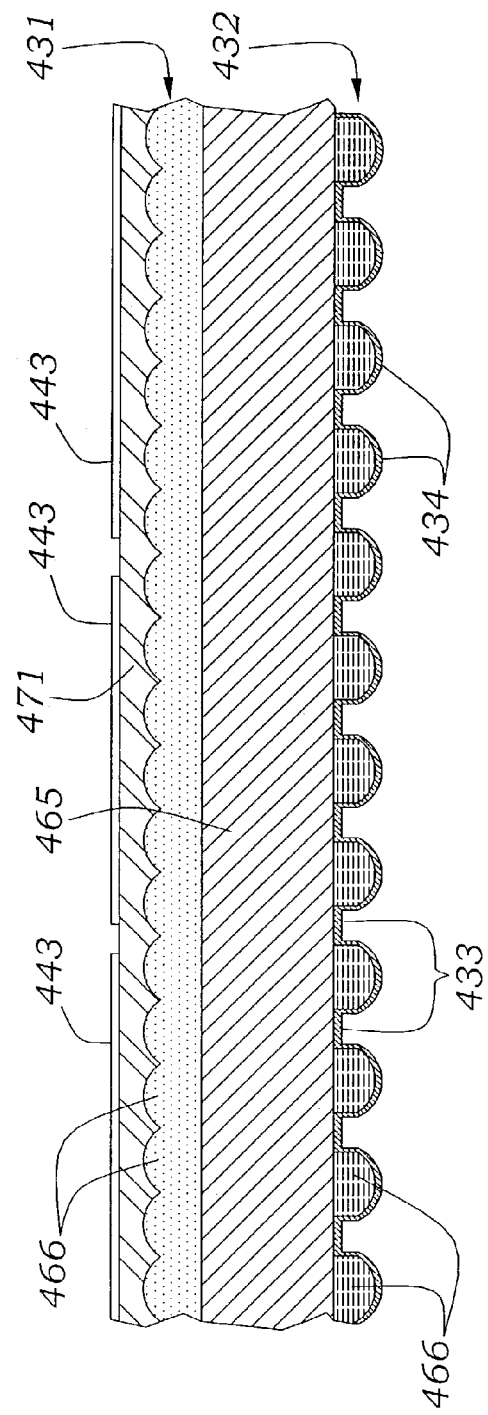
FIG. 6 is a cross sectional view of another alternative embodiment of the present invention.

FIG. 6 shows another embodiment of the invention in which focusing optics 431 with a high refractive index are embedded in a low refractive index layer 471. The focusing optics 431 will preferably be made from a photopolymer 466 with a refractive index of up to about 1.55, but other photo-initiated acrylated epoxies with refractive indexes of about 1.6 can also be used. The low refractive index layer 471 will preferably consist of a polymer. The polymer does not necessarily have to be a photopolymer, but one could be used if it had a low enough refractive index. It is desirable that the polymer have as low a refractive index as possible in order to counterbalance the high refractive index of the focusing optics 431.

Examples of polymers that can be used for the low refractive index layer 471 (and their respective refractive index) are polytetrafluoroethylene (PTFE, "Teflon")(1.35), fluorinated ethylene propylene (FEP)(1.34), polyvinylidene fluoride (PVDF)(1.42), and polytrifluorochloroethylene (PT-FCE)(1.43). The function of the low refractive index layer 471 is to make the surface of the light control material smooth, thereby making the device more amenable for printing. The low refractive index layer may be formed by, for example, a melt process allowing the polymer to be applied as a liquid and to be self-leveling. The low refractive index layer 471 may also be used as an adhesive between the high refractive index lenses 431 and a polymer film having better printing characteristics. The focusing optics 431 are designed with a particular radius of curvature depending on the refractive index of the polymer. The lower the refractive index of the polymer 471, the lower the curvature of the lenses. The closer the refractive index of the polymer 471 approaches the refractive index of the photopolymer 466, the more curved the lenses have to be. The higher the refractive index of the photopolymer 466, the thinner the light control material.

The photopolymer 466 is embossed onto an optical substrate 465, consisting of a commercial plastic film such as polyester. In this embodiment, the refractive index of the optical substrate 465 is not critical. A change in the refractive index of the optical substrate 465 is easily compensated for by changing the thickness of the plastic film material. In general, the higher the refractive index of the optical substrate, the thicker the film material required.

Figure 7:
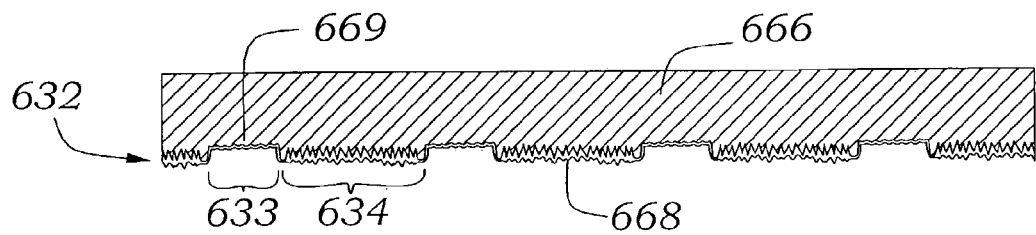
FIG. 7 is a cross-sectional view of a further alternative embodiment of the present invention.

FIG. 7 shows a further alternative embodiment for the light control optics 632 of the present invention. In this embodiment, the substrate is formed of a reflective layer 668 which comprises both bright zones 633 and dark zones 634. The bright zones have a diffractive pattern 669. The dark zones are formed of fields of cones. In their preferred form the cones in the dark zones have an aspect ratio of their height being 4 times their width or greater. In this manner light entering the dark zones does not reflect back out of the dark zones. A photopolymer 666 as previously described covers the substrate.

Figure 8:
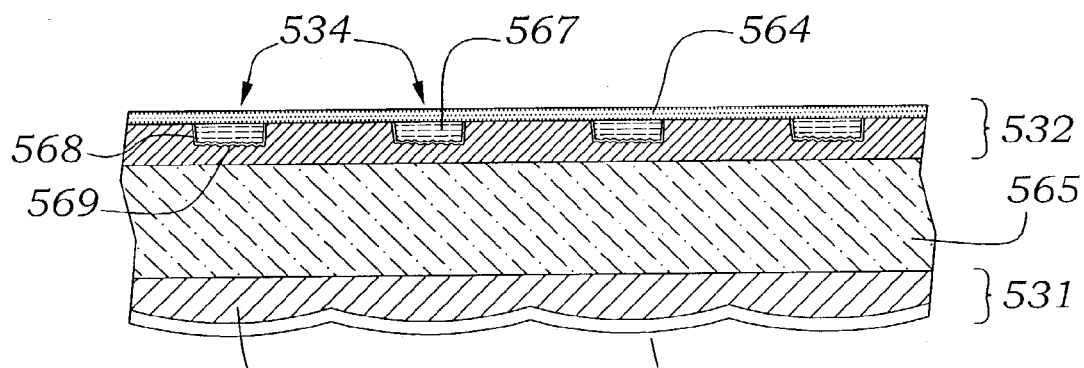
FIG. 8 is a cross-sectional view of yet another alternative embodiment of the present invention.

FIG. 8 shows another embodiment of the invention in which the relative positions of the focusing optics and light control optics are reversed. This embodiment also is formed using a transparent substrate 565. The light control optics 532, here used as the "outer optic", consists of zones 534 which appear dark from the outside of the structure but reflective from the inside of the structure, which zones are made by applying an opaque material 567 to a reflective substrate 568, such as aluminum. A diffractive pattern 569 may also be applied to the reflective substrate 568 to enhance the brightness of the image element 564. The dark zones of the light control outer optic consist of the transparent spaces between the reflective zones. The opaque material 567 prevents the reflective substrate regions 568 from reflecting light back to the observer without having first been reflected from the focusing optics 531. The focusing optics 531 are likewise used as the "inner optic" in this embodiment. The focusing elements are formed by embossing a photopolymer 566 to a transparent substrate 565 and coating the photopolymer surface with a reflective substrate 570. In this embodiment, the focusing optics 531 will function as focusing reflectors. The same photopolymer or other transparent embossing material 566 may be used to emboss the focusing optics 531 and the light control optics 532.

Micro-optics can be used to identify or authenticate an object by labeling, adhering or embedding micro-optic systems on or into a surface of the object. For example, the micro-optics can be arranged in a specific pattern on or in a surface to produce a distinguishing or recognizable image using reflected light. This image can be formed without a prefabricated image imprinted or overlaid onto the micro-optics. Thus, in one embodiment, a distinguishing, recognizable or identifiable image is produced using micro-optics that do not contain pigment, for example added pigment. Because the production of the micro-optics is complex, the quality of a reproduction will be readily distinguishable from non-reproduced micro-optics by comparing the images produced by reflected light or comparing the image quality to a known standard. Color, contrast, brightness are exemplary criteria that can be used to distinguish a reproduction from an original. Alternatively, the micro-optics can be designed to produce an image of a specific graphic, logo, text, bar code, symbol, 3D image, 2D image, autostereoscopic image, or unique identifier. Typical reproduction methods include photocopying or scanning. These reproduction can be readily identified because the reproduction will not include the micro-optics.

2. Micro-Optics with Light Absorbing Dark Zones

In another embodiment, the present invention comprises a pattern of bright zones and dark zones, a plurality of gradient refractive index lenses, and a transparent substrate. The pattern of bright zones and dark zones provides light direction control. The gradient refractive index lenses provide light focusing control. The pattern of bright zones and dark zones and the gradient refractive index lenses are comprised in a single embossed layer of photopolymer. The embossment is bonded to a transparent substrate which provides mechanical stability. Interleaved image strips may generally be located anywhere between the embossed layer of photopolymer, and the observer. The gradient refractive index lenses, also referred to as the focusing optics, in conjunction with the inner optic and the interleaved image strips create the perception of autostereoscopic depth, motion, or color change.

Figure 9:
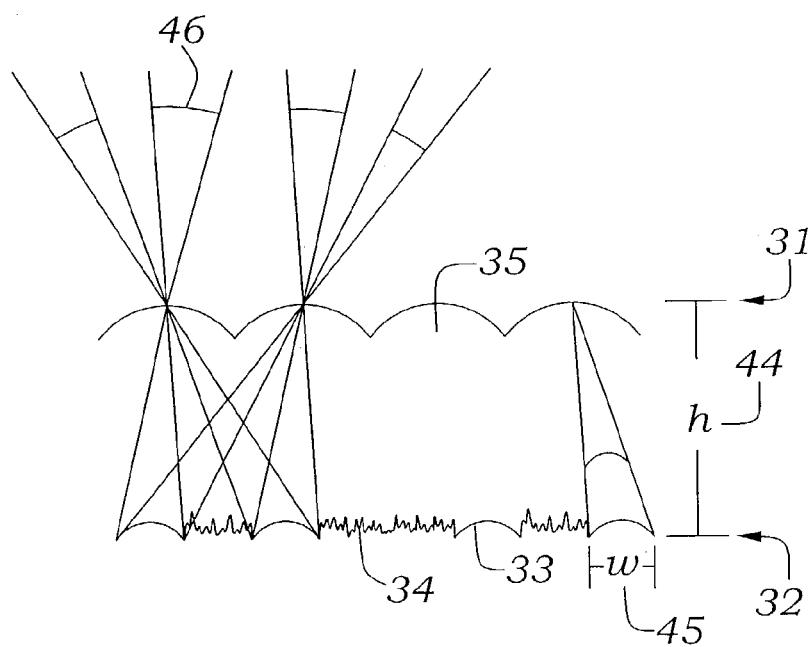
FIG. 9 illustrates an alternative embodiment of the light/control optics of the present invention.
Figure 10:
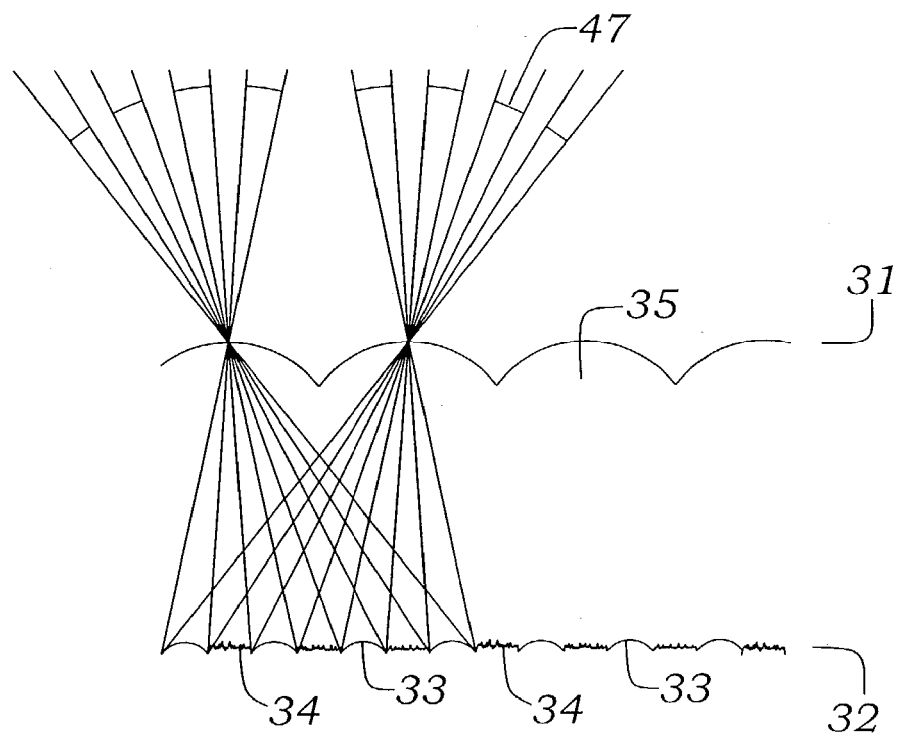
FIG. 10 illustrates how the field of view is controlled.

The light control optics shown in FIGS. 9 and 10 represent an exemplary embodiment of the present invention for the bright zones and dark zones. Cylindrical reflectors can be used to create the bright zones. By using cylindrical reflectors, light is reflected from the light control optics through a wide range of viewing angles. The light reflected from the light control optic avoids any specular reflection off of the surface of the image, thereby avoiding glare and enhancing the brightness of the image. Other arcuate reflectors, such as domes or ellipses, can also be used in the light control optics. When ellipses are used, an even wider range of viewing angles is realized. However, the intensity of the light reflected from the inner optics will be somewhat less when ellipses rather than cylinders are used as the bright zones.

The shape of the reflector used in the light control optic is selected in accordance with the range of viewing angles over which the brightness of the image is intended to be enhanced. Also, inverted dome-shaped (i.e., dish-shaped) reflectors can be used in the light control optic instead of dome-shaped reflectors. The effect of using dome-shaped or inverted dome-shaped reflectors is essentially the same, i.e., both enhance the brightness of an image over a particular range of viewing angles. The bright zones will be arcuate in shape regardless of whether the light control optic is operating in a transmissive or reflective mode. The light control optic will be coated with a reflective layer of metal when it is operating in the reflective mode. When operating in the transmissive mode, the bright zones will not be coated with a reflective layer of metal. The light control optic will be discussed in greater detail below.

The dark zones 34 are preferably comprised of a field of tapered elements. The tapered elements are formed by using reactive ion etching with oxygen as the reactive gas to create a non-uniform etch in a photopolymer. The result is a light trap comprised of stalagtite shaped structures which have large height-to-width ratios. The light traps will be described in detail below.

One embodiment advantageously incorporates the light direction control function of the inner optic and the light focusing control function of the outer optic into a single layer of photopolymer so that one master can be created which contains the inner optic pattern and the gradient refractive index hole pattern and embossments can be generated therefrom. This substantially eliminates problems with temperature and scale control requirements which are generally necessary to insure that the scale of the light direction control optics and the scale of the focusing optics are correct. A further advantage to incorporating the light direction and light focusing control functions into a single layer of material is that the light can be controlled very precisely.

Because the print is normally carried on a substrate, for example on conventional potato chip bags, a conventional printing process may be used when manufacturing a bag which incorporates the light control material of the present invention. The primary difference is that in the present invention, multiple print images must be interleaved. The process of actually printing the image on the substrate is essentially the same as the printing processes currently being used for this purpose with the exception that the printing plates carry interleaved image strips or print dots.

Figure 11:
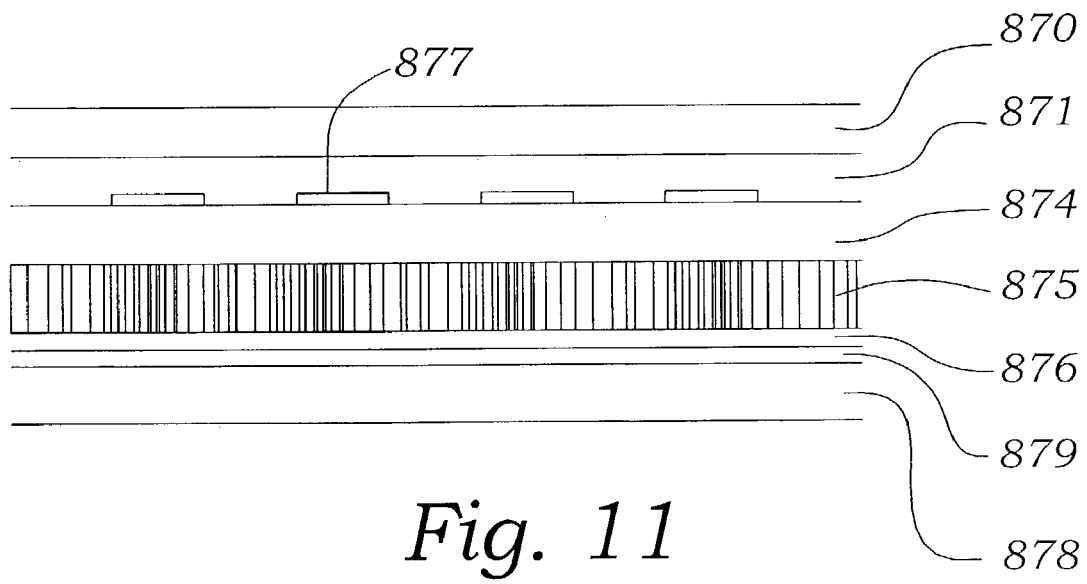
FIG. 11 illustrates one possible use of the light control material of the present invention.

FIG. 11 illustrates an example of one of many possible uses of the light control material of the present invention. The light control material comprising the light control optics 875 and transparent substrate 874 may be incorporated as an integral part of a potato chip bag. The potato chip bag may be comprised of an outer layer of plastic 870, an adhesive layer 871, the light control material of the present invention, a layer of aluminum 876 which will normally be used to coat the back surface of the light control optics 875 to enhance reflectivity, a second adhesive layer 879, and an inner layer of plastic 878.

Figure 12:
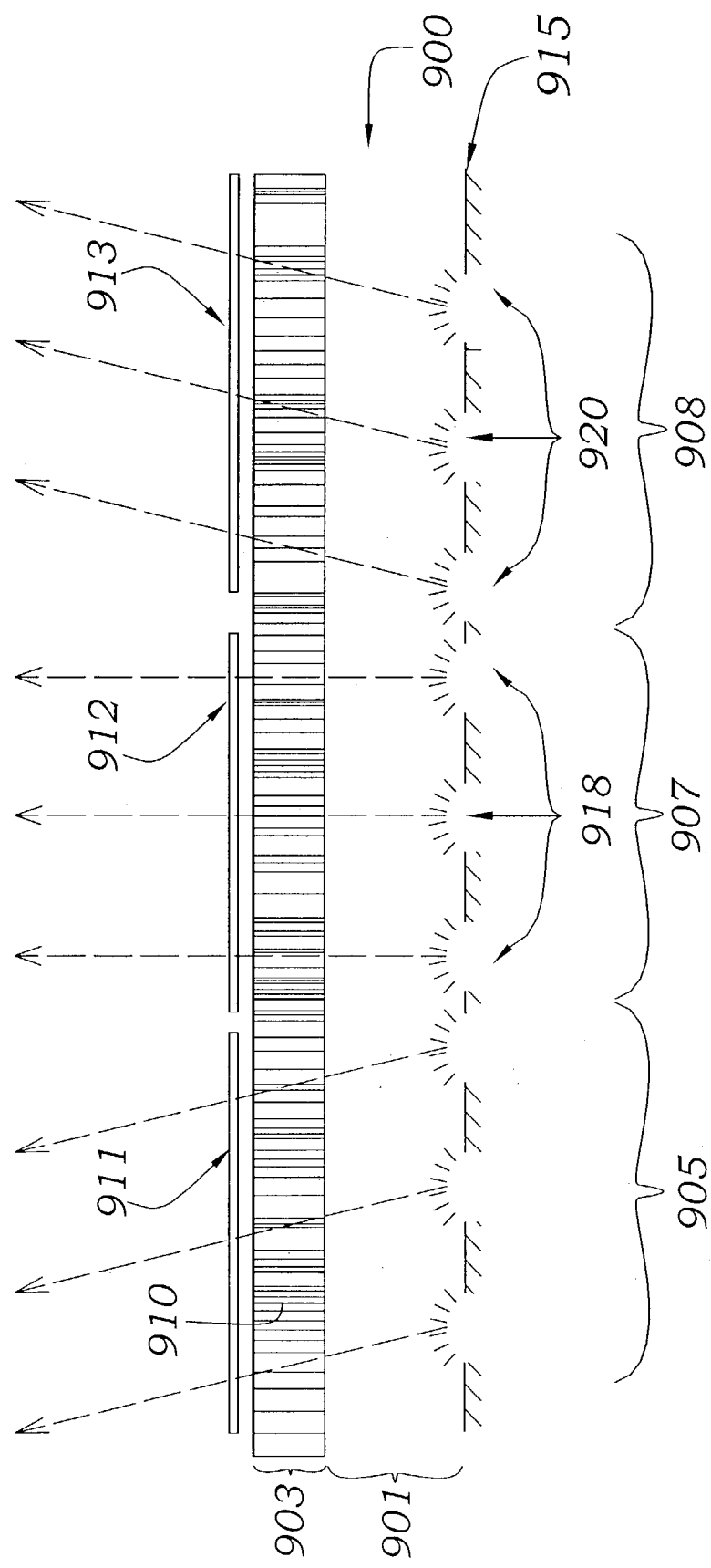
FIG. 12 is a cross-sectional view of an alternative embodiment of the present invention.

FIG. 12 shows an alternative embodiment of the present invention wherein the outer optic is comprised of a gradient refractive index lens. The structure of FIG. 12 operates in the same manner as the structure described above. In this embodiment, the outer optic 903 is comprised of gradient refractive index lenses which have been embossed from a master fabricated in accordance with the above-described methods. In the embodiments of FIG. 12, the pattern of bright and dark zones 918 and 920 is separated from the refractive index lenses 903 by a transparent substrate 901.

The light control material 900 is a two-layer optical system wherein the layers are separated by a transparent substrate 901. The outer optic 903 is comprised of a layer of photopolymer having gradient refractive index lenses formed therein. Preferably, the gradient refractive index lenses are converging lenses which have been formed by piercing holes through the photopolymer. Alternatively, the outer optic can be created by any known method for creating gradient refractive index lenses. The inner optic 915, which is comprised of bright zones 918 and dark zones 920, may operate in a light transmissive or reflective mode. The dark zones 920 may be either light absorbing or light dispersing. Preferably, the inner optic pattern is comprised of the brightness enhancer structures and light traps discussed above. Since the light control material 900 operates in the same manner as the light control material discussed above, any further discussion of the light control material 900 would be redundant and therefore will be omitted.

3. Micro-Optics Comprising an Emulsion

Still another embodiment provides an apparatus having an inner optic, a substrate, and a layer of emulsion having interleaved images formed therein. Using interleaving images in a layer of emulsion enables the production of image strips that are small than image strips obtained by conventional printing. This micro-optic system can be used in identifying or recognizing or distinguish between an original and a replicated surface by producing arranging the micro-optics in a specific pattern to produce an image using reflected light. The content and quality of the image produced by the micro-optics described herein can be used to determine whether the micro-optics have been replicated, thus indicating whether the substance to which the micro-optics are associated is also a reproduction.

In a preferred embodiment, the inner optic incorporates reflective regions which redirect ambient light to provide back illumination of the image strips formed in the layer of emulsion. In another embodiment, the inner optic incorporates transmissive regions which provide directional control of light passing through the inner optic for back illumination of the image strips formed in the layer of emulsion. In both of these embodiments the inner optic provides the light direction control needed to produce the perception of autostereoscopic depth, motion, or color change.

Figure 13:
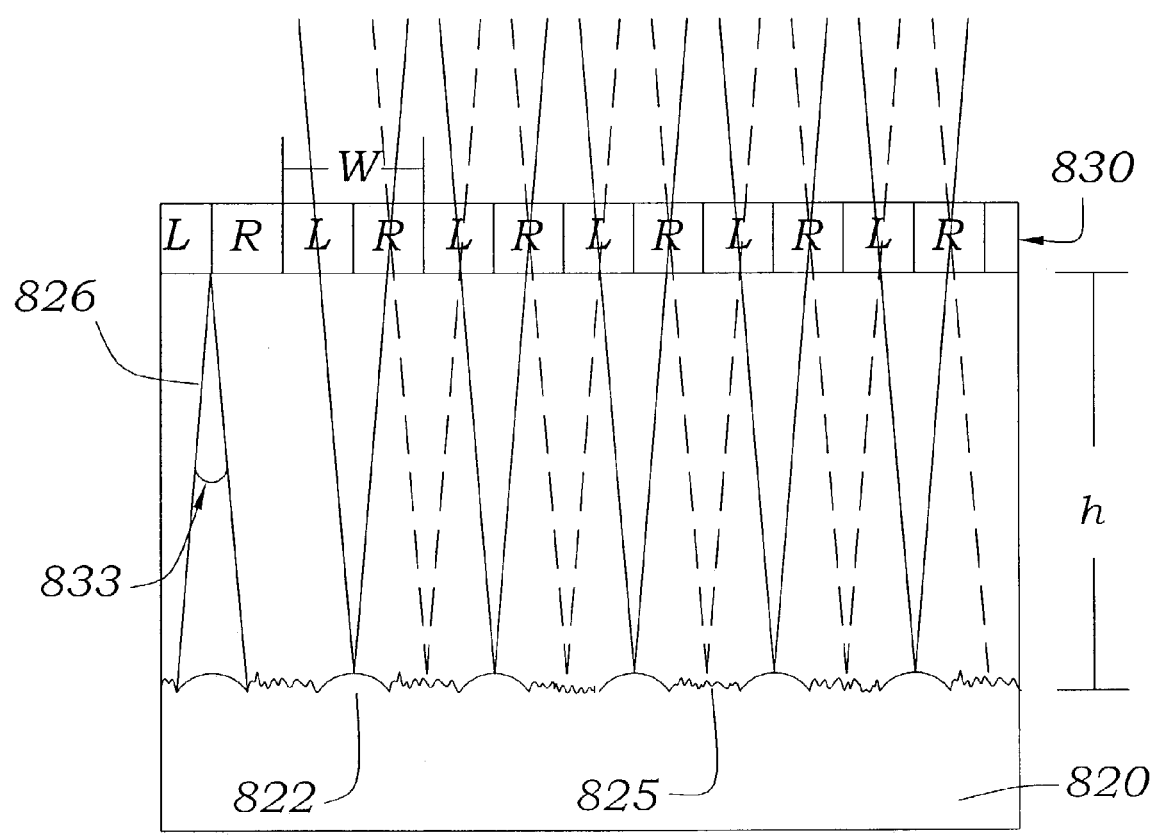
FIG. 13 illustrates a cross-sectional view of a preferred embodiment of the present invention for producing and displaying autostereoscopic and dynamic photographic images.

FIG. 13 illustrates a cross-sectional view of a preferred embodiment of the present invention for producing and displaying autostereoscopic and dynamic photographic images.

Preferably, the light control optic 820 is comprised of bright zones 822 and dark zones 825 which are essentially the same as the bright zones 33 and dark zones 34 described above. Furthermore, the light control optic may operate in a transmissive or reflective mode. In the preferred embodiment, when the light control optic is operating in a reflective mode, the upper surface of the light control optics is coated with a thin layer of metal, preferably aluminum, which provides the desired reflectivity. When the light control optic is operating in a transmissive mode, only the light traps constituting the dark zones are coated with the reflective layer of metal. In the latter case, the reflective coating of the dark zones causes reflection and absorption of the light which enters the light traps. The reflective layer of metal is preferably put down by vapor deposition. However, any conventional technique for coating a surface with a thin layer of metal is suitable for use with the present invention. Returning again to FIG. 13, the period of the light control optic, which is characterized by the pattern of bright zones and dark zones, is constant. The light control optic 820 is embossed onto a substrate 826 which is preferably a layer of polyester. Substrate 826 is covered with a layer of preferably print-type emulsion 830. Other types of emulsions may also be used provided that they utilize transparent dyes as the means for coloring. Instant film emulsions are also suitable for use with the present invention. The emulsion is then exposed to form interleaved image strips in the emulsion.

The image strips are generally of the same width W as the bright zones 822 of the inner optic. The light control optic pattern of alternating bright and dark zones causes left directed light to illuminate the left image strips whereas no left directed light passes through the right image strips due to the locations of the dark zones. Likewise, right directed light illuminates the right image strips but not the left image strips. Therefore, one of the observer's eyes sees one set of image strips while the other eye sees the other set of image strips, thereby creating the perception of autostereoscopic depth, motion, or color change.

One of the advantages of the invention described with respect to FIG. 13 is that photographic images can be interleaved in a layer of emulsion to produce image strips which are much smaller than image strips which are obtained by printing. By reducing the width W of the image strips, the field of view can be narrowed. Narrowing the field of view increases the distance from which an observer can perceive an autostereoscopic image. Therefore, it is important to be able to control the field of view by means other than by increasing the height h of the substrate 826. Another advantage of using a layer of emulsion is that the emulsion can carry image detail which is much finer than the image detail which can be printed. Therefore, the autostereoscopic image produced by the embodiment of FIG. 13 can have a much higher resolution than an autostereoscopic image produced by printing.

The conventional barrier strip method utilizes a screen having slits therein which is placed above a back-illuminated image. The slits allow an observer to see a stereo pair of image strips. A disadvantage to this method is that a large amount of light is required to back-illuminate the image strips due to the fact that the barrier strip blocks the light everywhere except where a slit is located. Furthermore, the greater the number of images used to create the interleaved image strips, the smaller the width of the slits relative to the width of a period, i.e., more light is needed to illuminate the image.

The embodiment of FIG. 13 utilizes a light control optic pattern which produces an effect which is similar to the effect produced by the barrier strip method. However, the light control optic 820 provides light direction control by illuminating the image strips in accordance with the period of the bright and dark zones. In essence, the light control optic 820 provides illumination of the image strips as well as the light direction control needed to produce the autostereoscopic effect.

Figure 14A:
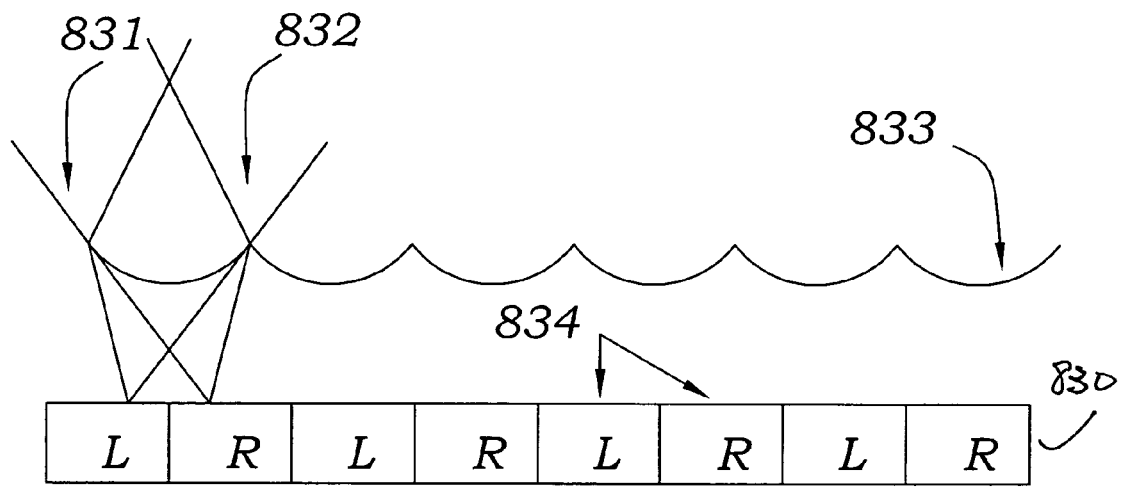
FIGS. 14a and 14b illustrate an embodiment for forming interleaved image strips in the emulsion.
Figure 14B:
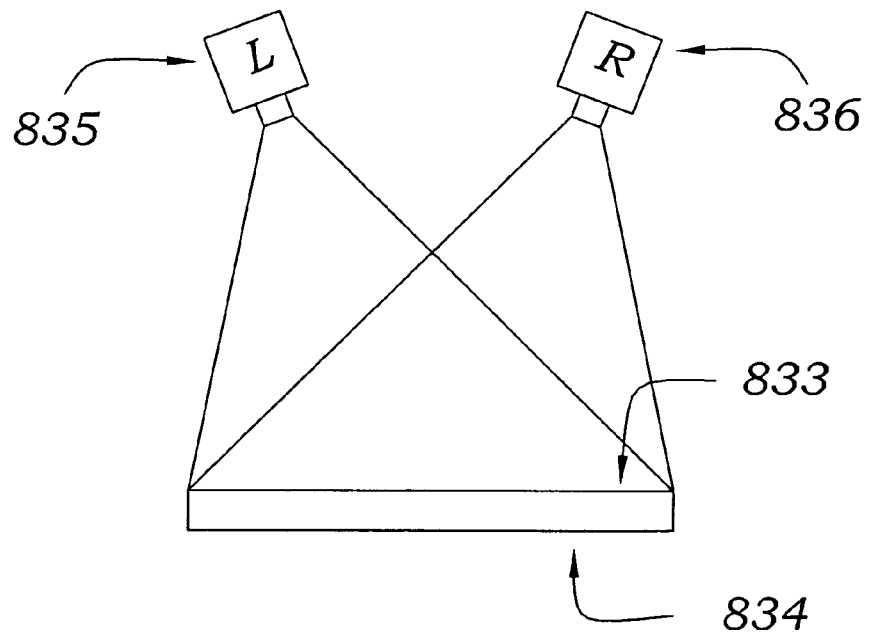

FIGS. 14a and 14b illustrate a first method for interleaving the images in emulsion 830. A lenticular screen 833 comprised of cylindrical lenses is placed above emulsion 830 such that the emulsion 830 is at the focal point of the cylindrical lens array. The emulsion 830 is then exposed to the images (e.g., left and right images) by projectors 835 and 836. The images may be presented simultaneously or in sequence. The angles of exposure and the focusing characteristics 831, 832 of the lenses cause interleaved image strips 834 to be produced in the emulsion when the emulsion is developed.

Figure 15A:
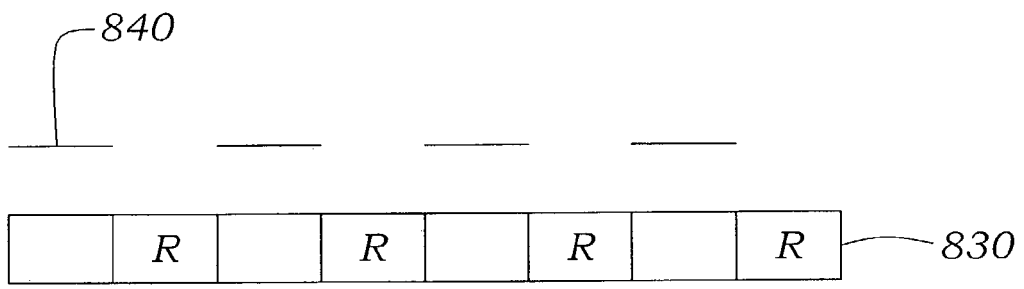
FIGS. 15a and 15b illustrate another embodiment for forming interleaved image strips in the emulsion.
Figure 15B:
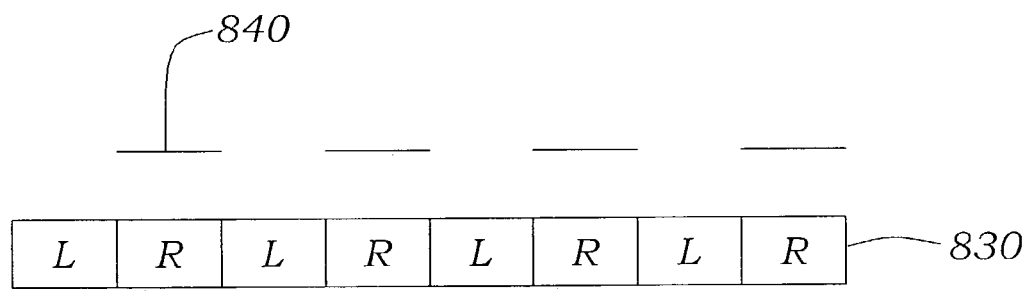

FIGS. 15a and 15b illustrate a second embodiment for interleaving the images in emulsion 830. The emulsion 830 is exposed to the right image through mask 840. The emulsion 830 can be exposed through contact printing or by projection with an enlarger (not shown). The mask 840 is then shifted to cover the right image strips and the emulsion is exposed to the left image. The emulsion is then developed, thereby producing interleaved left and right image strips in the emulsion, as shown in FIG. 15b. Although only left and right image strips are shown in FIGS. 13–15b, these embodiments are not limited to any particular number of images. Left and right images are shown merely for ease of illustration. The number of images which can be interleaved in emulsion 830 is limited only by the limitations of conventional techniques used for interleaving images in an emulsion.

One of the advantages of the invention described with regard to FIGS. 13–15b is that conventional photoprocessing techniques can be used to produce the autostereoscopic and dynamic images. Normally photographic materials consist of photographic paper with an emulsion thereon. The emulsion is exposed and developed to produce a photographic print. The present invention contemplates embossing the inner optic structure 830 and transparent substrate 836 onto a photographic paper substrate (not shown). The thickness of the paper substrate can vary as can the thickness of substrate 826 depending on the desired total thickness of the product. A layer of emulsion, preferably print-type emulsion, is applied to the top surface of the transparent substrate. The material which comprises the photographic paper, the inner optic, the transparent substrate, and the emulsion can be made commercially available as a photographic material. Conventional photoprocessing techniques can be used to expose and develop the emulsion to produce the autostereoscopic or dynamic images of the present invention. Although the exposure technique requires interleaving multiple images in the emulsion, conventional techniques used for exposing an emulsion to produce interleaved image strips in the emulsion are suitable for use with the present invention.

Generally, the width W of the image strips will be on the order of 0.001 inches. The thickness of transparent substrate 826 will depend on how thin the image strips can be produced. Generally, the height h of the transparent substrate will be on the order of 0.003 inches. The width of the bright zones 822 in the inner optic 820 is not a limiting factor and it will generally be equal to the width of the image strips. The field of view 833 can be narrowed by decreasing the width w of the image strips (and the width of the bright zones) or by increasing the thickness h of substrate 826, or both.

B. Engineered Scatter for Brightness Enhancement

Another embodiment of the present invention provides a reflective substrate that controls scatter into a designed field of view. When this substrate is used as a printing or photographic substrate it has the effect of dramatically intensifying the brightness of an image, causing it to appear as though it includes a backlight. Conventional printing and imaging substrates, such as high whiteness papers, scatter light in all directions in a Lambertian distribution: the majority of the light illuminating the image is wasted, scattered away from the viewer. Thus, micro-optics engineered to direct reflected light in a specific field of view can be used to identify, authenticate, recognize or differentiate between a reproduction and an original, for example by comparing the content and quality of an image produced by the micro-optics. For example, the micro-optics described herein can be used to make a defined area of a diffuse substrate appear comparatively brighter. By varying the degree of light reflected into a field of view, for example by having areas with micro-optics differing in the effective radius of curvature, an image can be produced, for example an watermark image. This image is formed without using pigments or coloring agents, inks, or the like.

An exemplary reflective substrate disclosed herein increases the apparent brightness of an area by constraining the scattered light to fall primarily within a designed field of view, or 'sweet spot'. The 'sweet spot' can be circular, elliptical, square, or other shape. The solid angle of the cone of the scattered light determines the intensification as compared with a Lambertian scattering surface. Intensification of the perceived image brightness by a factor of two or three is easily attained in the 'sweet spot' at the cost of reducing the perceived image brightness outside of the 'sweet spot'. The intensification effect can be so large that the image brightness overpowers surface glare and gives the image an 'almost 3-D' appearance. The reflective substrate can also be used without an image to provide an optically variable effect which is visually distinct and eye-catching. The apparent size of the 'sweet spot' determines its brightness: a wide field of view, such as sixty degrees, will provide modest brightness enhancement over a large range of viewing angles, while a tight field of view, such as ten degrees, will provide maximum brightness within a small range of viewing angles. In the latter case the reflective substrate material can be designed to appear to 'turn on' abruptly as the 'sweet spot' is swept across the visual field, producing an effect similar to the beam of a flashlight.

In another embodiment, the scattering properties of the reflective surfaces can be pattern modified to any degree desired with text, graphical logos, and even photographic images. Very small differences in the scattering angle can be used to produce subtle, almost covert, watermark effects. Stronger modification of the reflective surface properties produce more obvious, overtly visible, brightness differences.

Relatively large scale (30 to 80 micron diameter) focusing reflector micro-optics are used to achieve the desired reflective effect, minimizing diffractive color effects and producing a solid white illumination. Holographic simulations of the this effect suffer from strong color fringing at the edges of the 'sweet spot' and lower overall brightness due to energy dispersion into multiple diffractive orders.

Another embodiment of the present invention is directed to a light control device which enhances the brightness of an image independent of the angular extent of the light source illuminating the image. An exemplary light control device is comprised of a plurality of micro-optic focusing elements on which the image is placed. The focusing elements of the present invention have geometries which are curved in at least one dimension and which are selected to provide a particular minimum field of view. The focusing elements "re-image" the light source, i.e., they provide a minimum field of view which is independent of the angular extent of the light source. The overall field of view provided by a particular focusing element is dependent upon the geometry of that focusing element and the angular extent of the light source. By controlling the minimum field of view of the focusing elements, the overall field of view (hereinafter field of view) of an image can be controlled. This allows light to be reflected and concentrated through a range of viewing angles which in turn allows the brightness of an image to be enhanced through the range of viewing angles. The present invention also provides means for reducing the effect of specular reflection which is often seen as glare. When symmetrical focusing elements are used, light from the focusing elements is centered about the specular reflection thereby providing angles on either side of the angles of specular reflection from which the image can be viewed while avoiding the specular reflection. When asymmetrical focusing elements are used, a field of view can be provided which does not include the angles of specular reflection, thereby allowing the angles of specular reflection to be avoided. When symmetrical focusing elements having narrow fields of view are provided, the light coming from the focusing elements is concentrated such that it overpowers the specular reflection, which is typically on the order of 4% of incident light.

Figure 16:
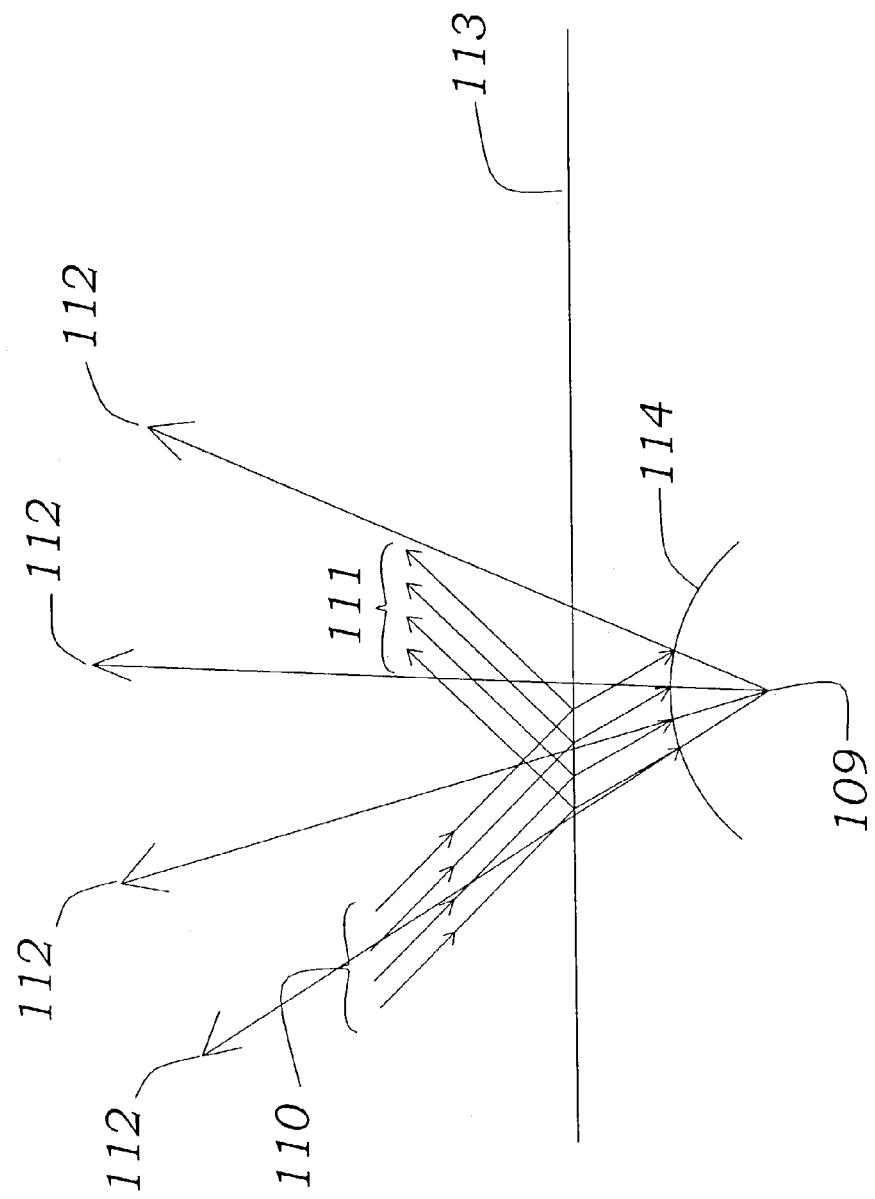
FIG. 16 illustrates the basic concept of the present invention for controlling the field of view.
Figure 31:
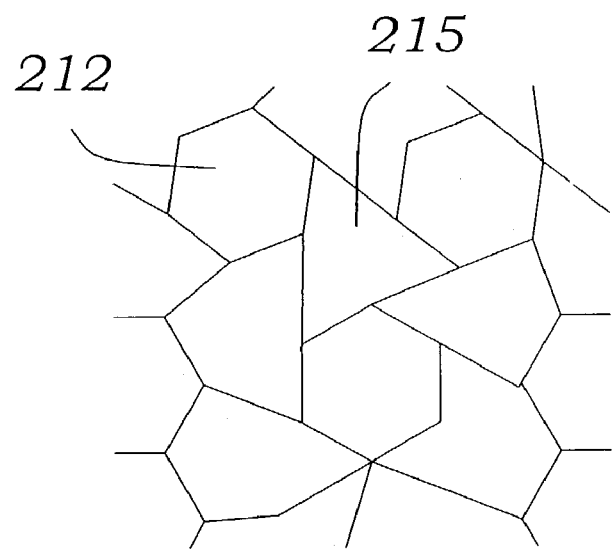
FIG. 31 illustrates a plan view of an alternative embodiment of the focusing elements of the present invention wherein the pattern of elements reduces diffractive effects.

FIG. 16 illustrates the basic operation of the present invention wherein convex, symmetrical reflectors 114 are utilized which are below the surface of a transparent substrate 113 and which reflect light 112 through a controlled range of viewing angles. Incident light 110 impinges on the surface 113 and a portion is specularly reflected 111 at angles equal to the angle of incidence. Incident light 110 which passes through the surface of transparent substrate 113 impinges on reflector 114. FIG. 31 depicts one embodiment of the present invention in which the convex reflector is a cylindrical shaped reflector having a focal point 109 located a distance equal to one half the radius of curvature of the reflector from the surface of the reflector. As incident light 110 strikes reflector 114, the light reflects along a line which passes through the focal point and which intersects the point at which the ray of light impinges on the surface of the reflector. The reflected light, as denoted by rays 112, is dispersed through a range of directions, called viewing angles. The range of viewing angles, or field of view, from reflector 114 is controlled by its geometry, including its radius, width, and degree of symmetry. FIG. 1 illustrates how reflector 119, having a smaller radius than that of reflector 114, produces a different pattern of reflected light. As incident light 115 impinges on the surface of reflector 119, light 117 is dispersed through a wider range of viewing angles than that shown in FIG. 16. Also, the closer that the proportions of a reflector approach a hemisphere, the wider the range of reflected viewing angles.

Figure 17:
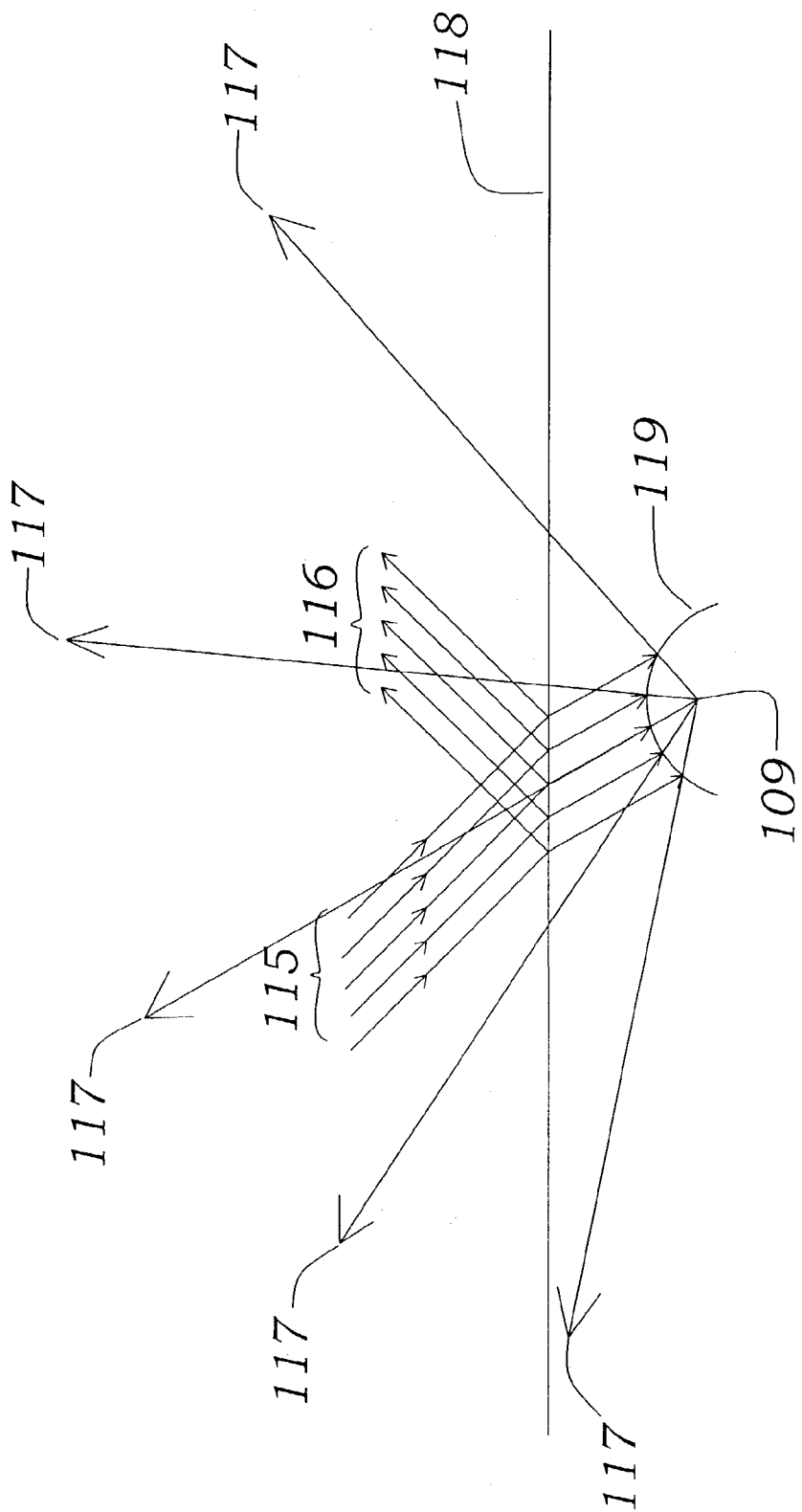
FIG. 17 illustrates how the field of view may be altered in accordance with the present invention by changing the geometry of the focusing elements of the present invention.

FIG. 17 illustrates how reflector 119, having a smaller radius than that of reflector 114, produces a different pattern of reflected light. As incident light 115 impinges on the surface of reflector 119, light 117 is dispersed through a wider range of viewing angles than that shown in FIG. 17. Also, the closer that the proportions of a reflector approach a hemisphere, the wider the range of reflected viewing angles.

Figure 18:
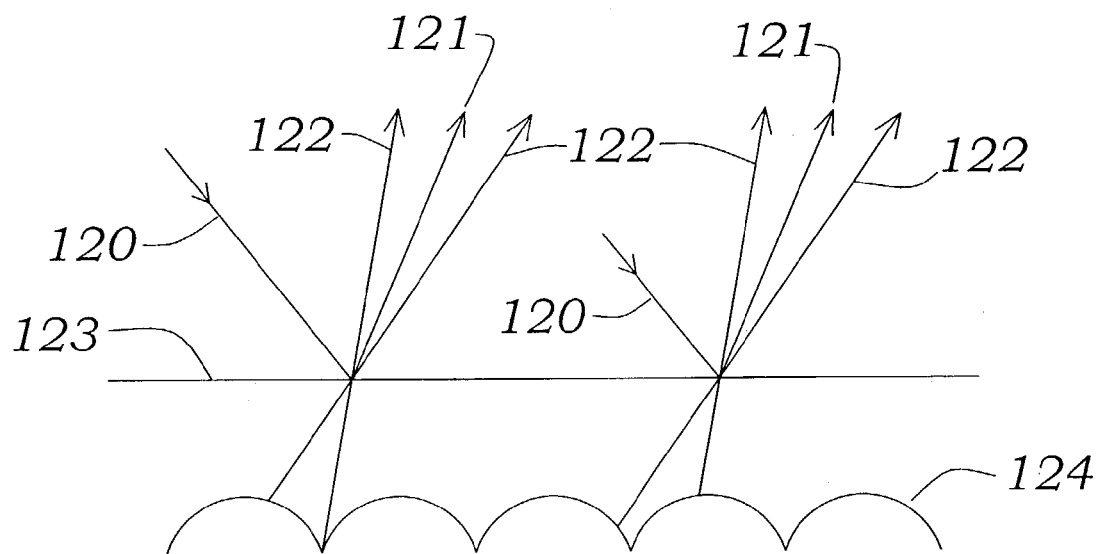
FIG. 18 illustrates how the light control material of the present invention allows specular reflection to be avoided.

FIG. 18 illustrates how the present invention allows the angles of specular reflection to be avoided. Incident rays 120 impinging on surface 123 are specularly reflected 121 at angles which are equal to the angle of incidence. On either side of the specular reflections 121 there are bright illuminations 122 coming from the second surface of the structure. These bright illuminations can be viewed from angles different from the angle of specular reflection, thereby avoiding the specular reflection viewing directions, which are usually seen as unwanted glare.

If the reflectors are used in conjunction with a diffuse surface, light reflected from the surface of the reflectors may be concentrated into a smaller solid angle than light reflected from the diffuse surface, so the light intensity within this range of viewing angles is greater than that resulting from the diffuse reflection.

Figure 19:
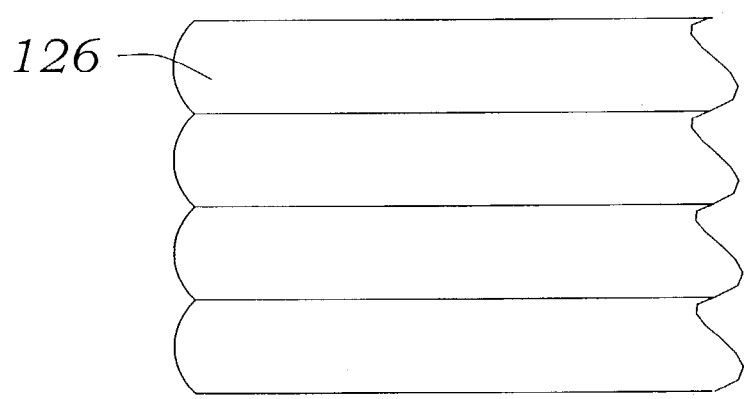
FIG. 19 illustrates a plan view of one embodiment of the focusing elements of the present invention.
Figure 20:
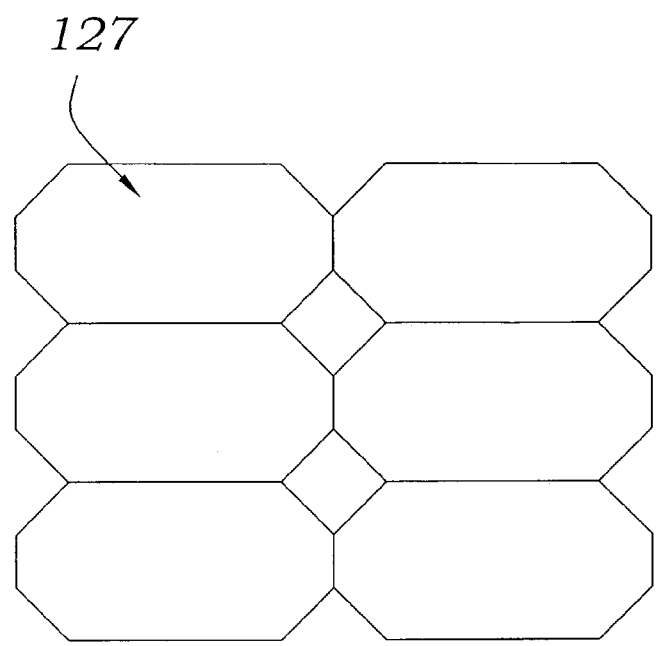
FIG. 20 illustrates a plan view of an alternative embodiment of the focusing element of the present invention.

FIG. 19 illustrates a plan view of one embodiment of the present invention wherein the reflectors 126 are cylindrical. FIG. 19 illustrates another embodiment of the invention wherein the reflectors 127 are octagonal. By varying the shape of the reflectors, the range of angles over which the brightness of an image will be enhanced can be altered. For example, when using cylindrical reflectors, the light source, the point of incidence on the reflector, and the viewing position must be substantially coplanar. When using other shapes, such as octagons or ellipsoids, parallel rays of light which are incident upon the surface may be reflected in many different directions. Although these shapes do not unidirectionally concentrate the light as intensely as the cylinder, the material will look bright over a wider range of angles due to the three dimensional curvature of the surfaces. By using ellipsoids, the angles of reflection can be controlled much like the cylinder, but a wider range of viewing angles can be realized. Although hexagonal concave reflectors (discussed below with respect to FIG. 30) are preferable, the invention is not limited to any particular shape of focusing element. Asymmetrical patterns of focusing elements can also be created which can provide greater control of the light while also reducing diffractive effects, as described below with respect to FIGS. 30 and 31. An example of asymmetrical focusing elements are the truncated conical reflectors 162 shown in FIG. 21.

Figure 21:
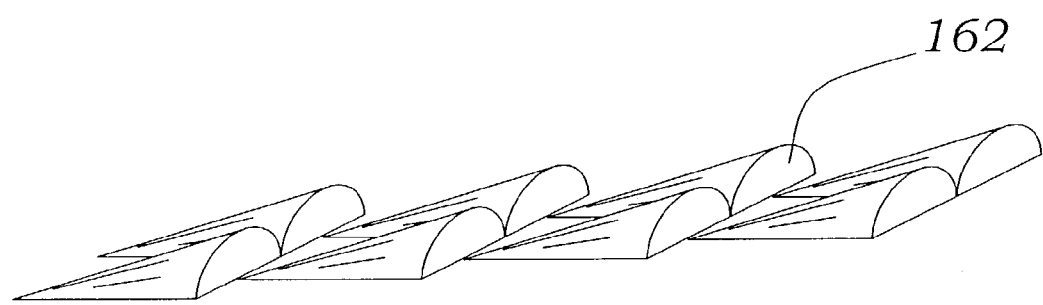
FIG. 21 illustrates an isometric view of an alternative embodiment of the focusing elements of the present invention.
Figure 22:
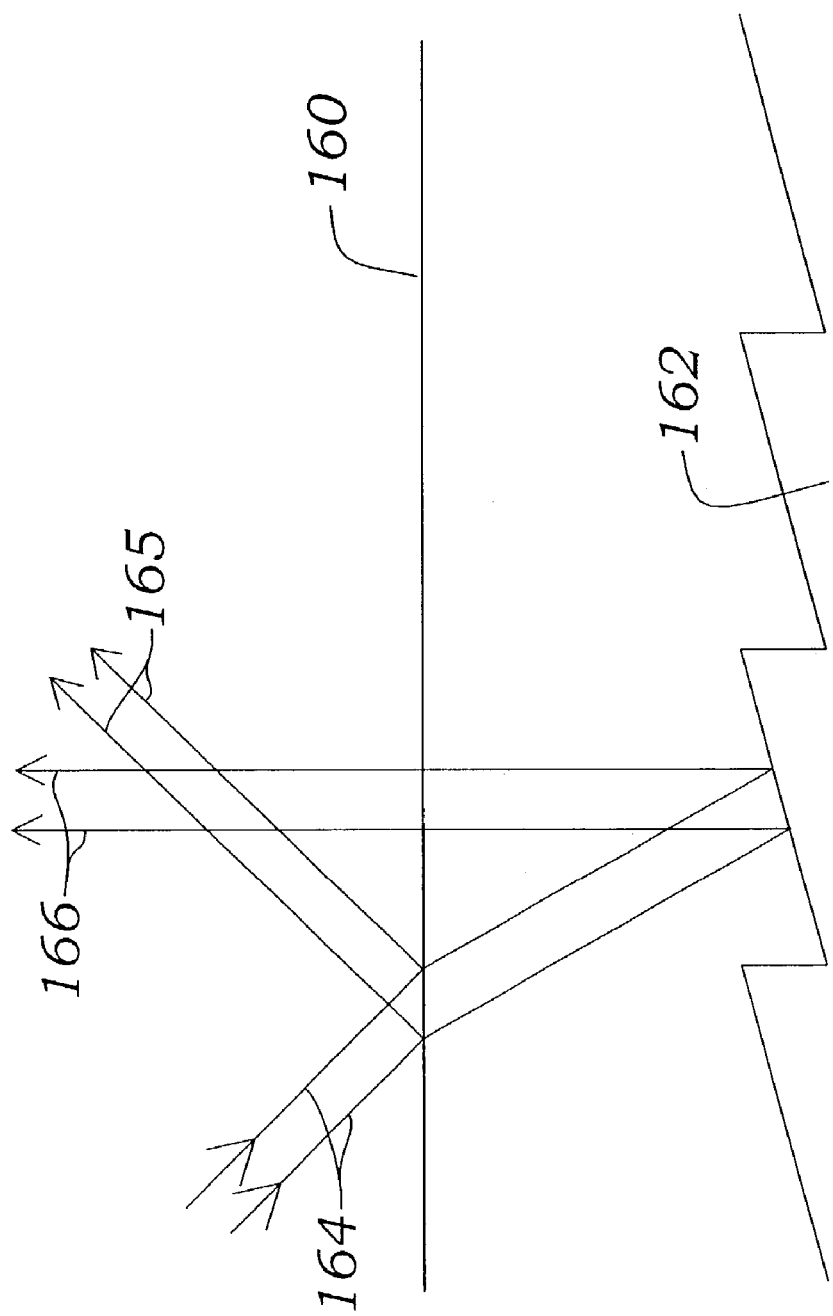
FIG. 22 illustrates a cross-sectional view of the light control material of the present invention incorporating the focusing elements shown in FIG. 36.

FIG. 22 illustrates a cross-sectional view of the light control material of the present invention incorporating the truncated conical reflectors of FIG. 21. As indicated by the light rays 166 reflected from reflectors 162, the field of view is almost normal to the surface 160 of the light control material. As stated above, by using asymmetrical focusing elements, a field of view can be provided which does not include the angles of specular reflection. This allows a brightness enhanced image to be viewed through a range of angles which contains no specular reflection. Rays 165 indicate specular reflection. When the light control material is viewed along rays 166, specular reflection (i.e., glare) will be avoided. As discussed, methods for creating the microoptics are known in the art. For example mass replications of a metal pattern can be made in plastic by any of a number of methods such as by embossing using heat, pressure, solvents or some combination thereof. See U.S. Pat. No. 4,888,260 to Cowan which is incorporated by reference in its entirety.

Figure 23:
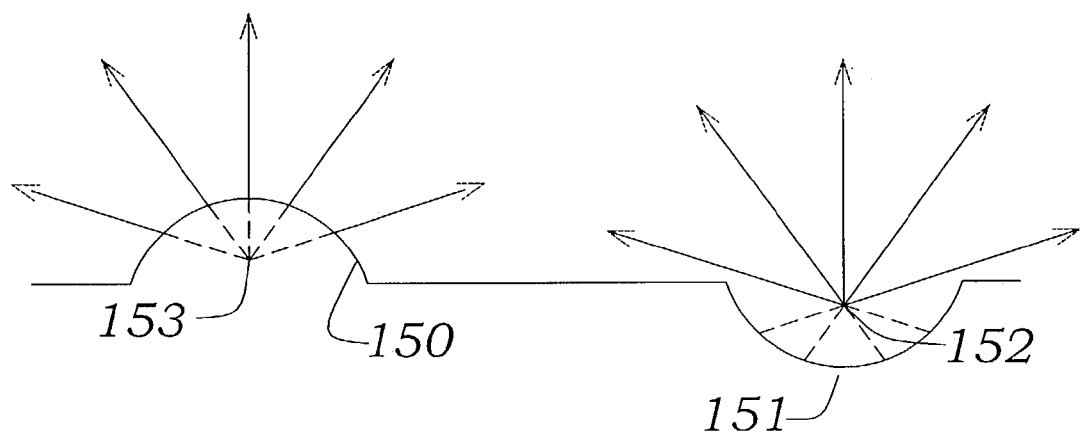
FIG. 23 illustrates optical properties of dome-shaped and dish-shaped focusing elements.

As illustrated in FIG. 23, the desired field of view can be obtained by using convex 150 or concave 151 focusing elements. Concave, reflective focusing elements are preferable, as will become apparent from the embodiments shown in FIGS. 25–29 and discussed below. The focal points 152 and 153 are located a distance equal to one half the radius of curvature from the surface of the focusing element.

Figure 24:
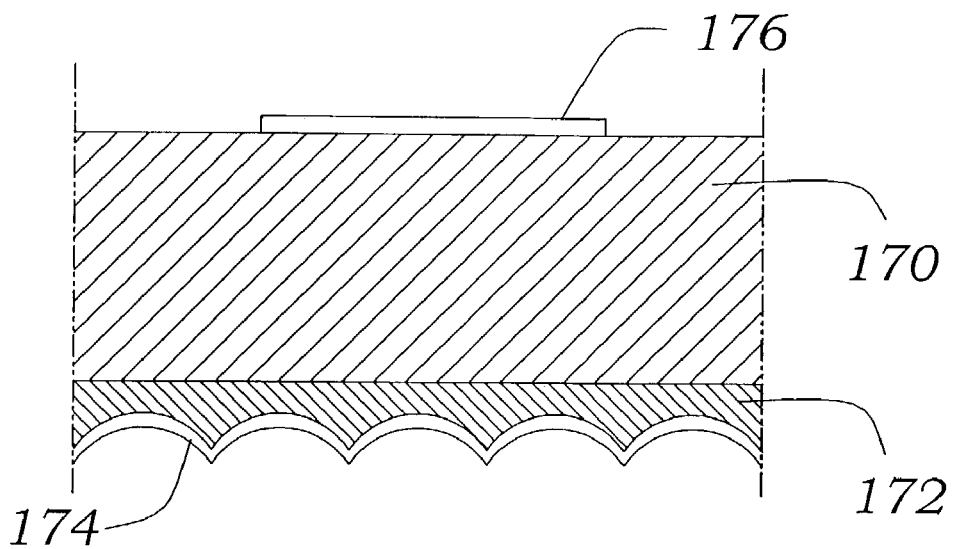
FIG. 24 illustrates a cross-sectional view of one embodiment of the light control material of the present invention.

In the embodiment shown in the cross-sectional view of FIG. 24, the light control material of the present invention comprises a transparent substrate 170 such as a plastic film which is bonded to an embossed layer of polymer 172, preferably polypropylene, having convex focusing elements formed therein and a thin layer of metal 174, preferably aluminum which covers the focusing elements. The aluminum is preferably deposited by vapor deposition. A print or photographic image 176 is supported on the surface of transparent substrate 170. The structure of FIG. 24 may also be printed on aluminum layer 174 if a suitable ink is used on the exposed side of aluminum layer 174. Preferably, ultraviolet curing inks are used for this purpose. Therefore, the structure can be printed on both sides if desired.

Figure 25:
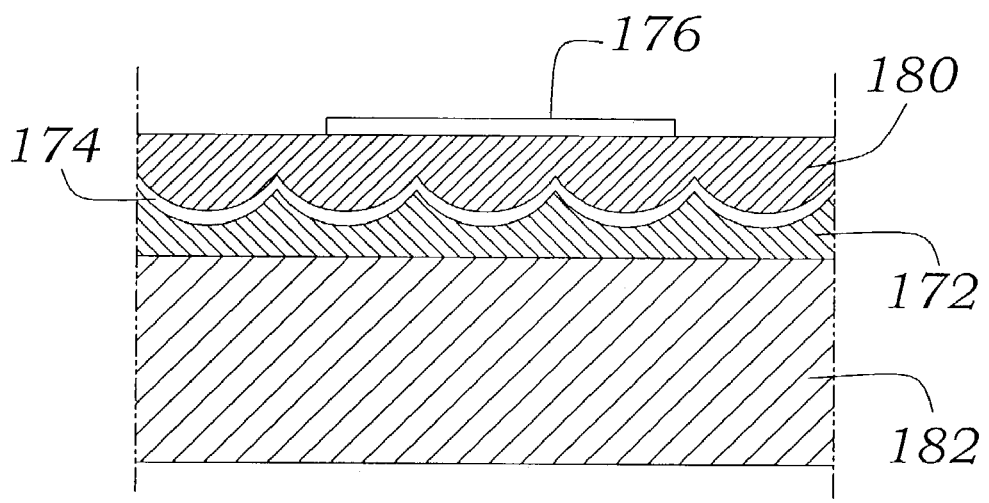
FIG. 25 illustrates a cross-sectional view of an alternative embodiment of the light control material of the present invention.

FIG. 25 illustrates a cross-sectional view of another embodiment of the present invention wherein the light control material comprises a substrate 182 which may be transparent or opaque, which is bonded to an embossed layer of polymer 172, preferably polypropylene, having concave focusing elements formed therein which are covered by a reflective layer of metal 174, and a transparent overcoat 180 which is conformed to reflective layer 174 and which has a printable surface. A print or photographic image 176 to be brightness enhanced is on the surface of the transparent substrate 180 which is a transparent overcoat. One type of material suitable for use as overcoat 180 is ICI NEOCRYL acrylic emulsion A-630.

If substrate 182 and embossed layer 172 are transparent, images can be carried on both sides of the light control material and they will be brightness enhanced by the focusing elements. If substrate 182 is opaque, it may be a plastic film such as $TiO_2$ filled polypropylene film, artificial paper, or a cellulose paper. If the substrate 182 is transparent, it may be one of many transparent plastic films such as polypropylene or polyester depending on the desired mechanical stability characteristics of the opaque substrate.

Figure 26:
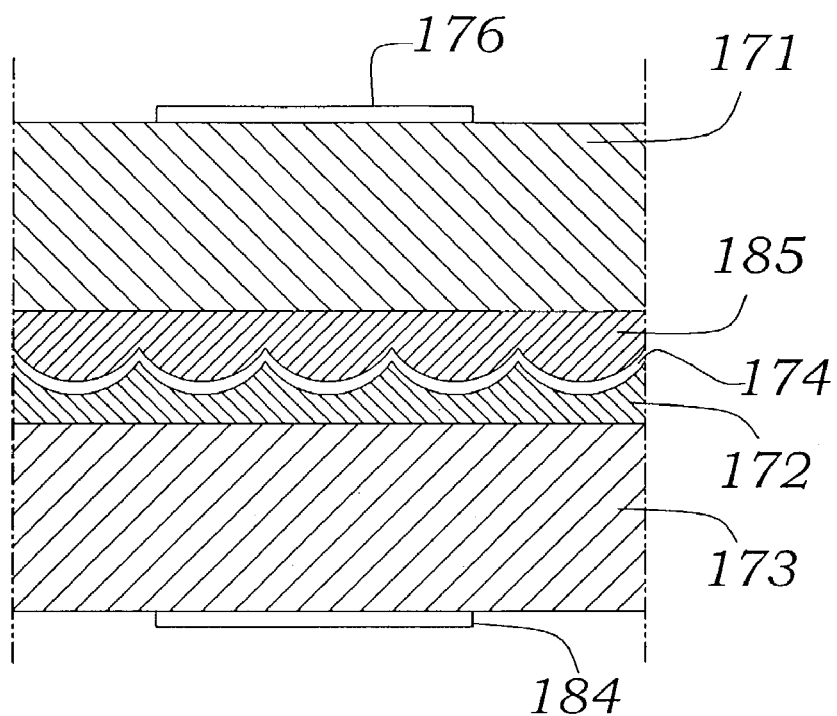
FIG. 26 illustrates a cross-sectional view of another alternative embodiment of the light control material of the present invention.

FIG. 26 illustrates a cross-sectional view of another alternative embodiment of the present invention wherein the light control material is illustrated as double sided and print or photographic images are shown being carried on both sides. This may be desirable where, for example, print or photographic images are to be carried on both sides of a page of a book or magazine. The light control material comprises transparent substrates 171 and 173 which are oriented polypropylene or polyester, an embossed layer of preferably polypropylene 172, which is typically extrusion embossed, having focusing elements formed therein, a reflective layer of metal 174 which is preferably aluminum for coating the focusing elements, and a transparent adhesive 185, which is preferably an extrusion lamination of polypropylene. Print or photographic images 176 and 184 are supported on the surfaces of substrates 171 and 173 and are brightness enhanced by the focusing elements.

Figure 27:
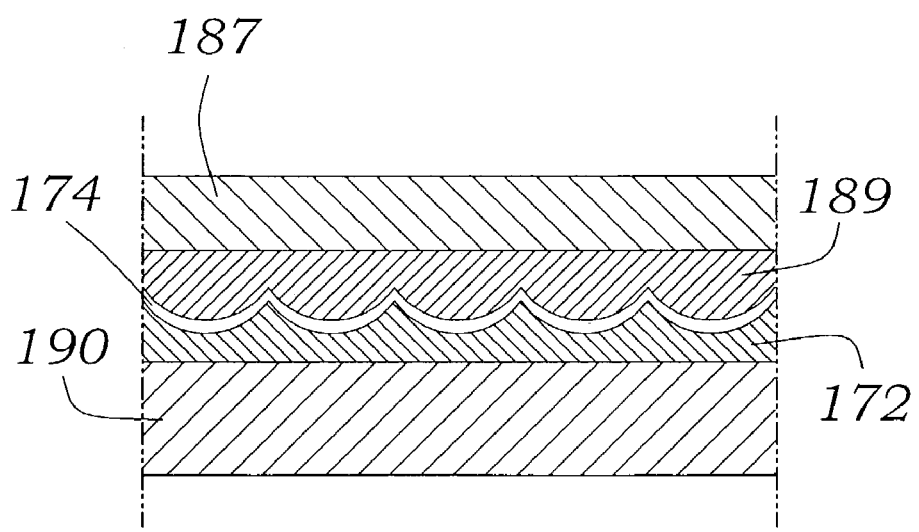
FIG. 27 illustrates a cross-sectional view of an alternative embodiment of the light control material of the present invention.

FIG. 27 illustrates a cross-sectional view of an alternative embodiment of the light control material of the present invention. The light control material comprises a substrate 190 such as paper, paper substitute, or film, depending on the intended application, an embossed layer of polymer 172, preferably polypropylene, having concave focusing elements formed therein, a reflective layer of metal 174 covering the focusing elements, and a transparent substrate which is a transparent conformal overcoat 189 and which is preferably of the same type described above with respect to FIG. 25 for overcoat 180. The overcoat 189 is preferably applied with a Gravure roller. The surface of overcoat 189 is covered with an emulsion 187, which is preferably a photographic print emulsion.

One of the advantages of the embodiment of FIG. 27 is the ease with which the light control material may be used with conventional photoprocessing techniques. Once the emulsion 187 has been applied to transparent substrate 189, a photograph can be produced by utilizing conventional exposure and developing techniques. The brightness of the photograph will be enhanced by the reflective focusing elements in accordance with the field of view provided by the focusing elements. Furthermore, if it is desirable to enhance the brightness of only selected portions of the photographic image, the pattern and/or geometry of the focusing elements may be varied such that certain portions of the image are made brighter than others. The ability to selectively enhance certain portions of a print or photographic image equally applies to all of the embodiments discussed with respect to FIGS. 24–29.

Figure 28:
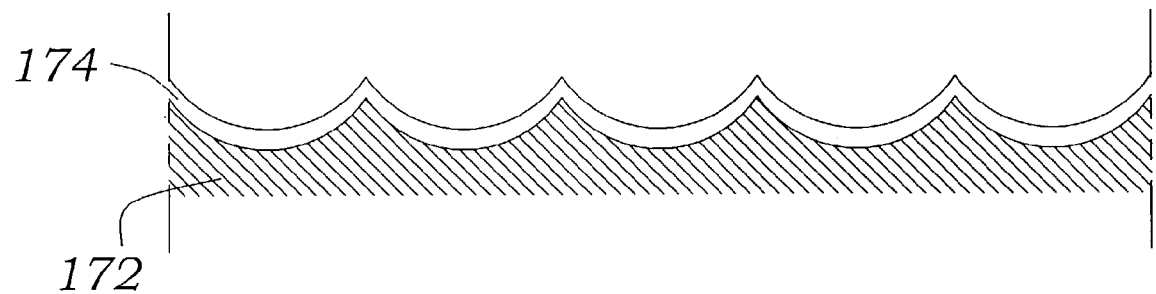
FIG. 28 illustrates a cross-sectional view of an alternative embodiment of the light control material of the present invention.

FIG. 28 illustrates an alternative embodiment of the light control material of the present invention wherein the light control material consists of an embossed polymer layer 172 having focusing elements formed therein and a reflective layer of metal 174 which is preferably aluminum. The embossed polymer layer is preferably an extrusion embossed layer of polypropylene. The structure is preferably used to carry a print or photographic image on either or both sides and to enhance the brightness thereof. However, the structure of FIG. 43 can be used to brightness enhance an image which is not in contact with the light control material. For example, the light control material of FIG. 27 can be used to brightness enhance a liquid crystal display wherein a minimum field of view can be provided which is independent of the angular extent of the light source. The contrast of the liquid crystal display can be enhanced over the field of view and specular reflection which constitutes glare can be avoided or overpowered, as discussed above.

Figure 29:
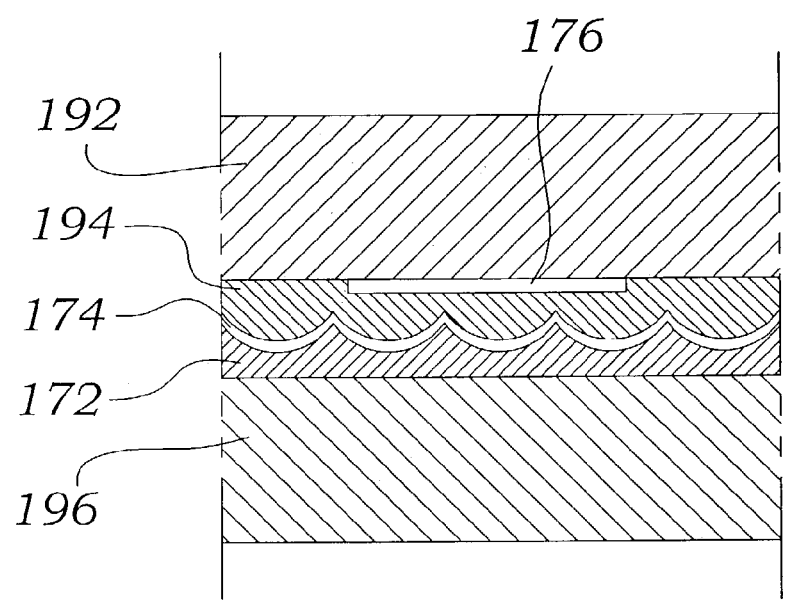
FIG. 29 illustrates a cross-sectional view of a preferred embodiment of the light control material of the present invention.

FIG. 29 illustrates a cross-sectional view of a preferred embodiment of the light control material of the present invention. The light control material comprises a transparent substrate 192, which is preferably oriented polypropylene, a transparent adhesive 194, preferably polypropylene, an embossed layer of focusing elements 172, which is preferably polypropylene, a reflective layer 174 covering the focusing elements, which is preferably aluminum, and a transparent substrate 196 which is typically a multi-layer material having heat seal properties and which may also contain an additional moisture barrier layer. For example, the multi-layer material may be comprised of polyethylene, nylon, and polypropylene. The nylon functions as a moisture barrier and the polyethylene acts as a heat seal. The print 176 is located between substrate 192 and adhesive 194. This embodiment represents the light control material of the present invention used in a typical packaging environment. A typical packaging structure normally has several layers of materials such as plastics and adhesives with the print embedded between the layers and a thin layer of metal which acts as an oxygen and moisture barrier. Therefore, this embodiment represents a cross-sectional view of a flexible film bag wherein the print 176 is brightness enhanced by the focusing elements. Reflective layer 172 serves the dual purpose of providing reflection and acting as an oxygen and moisture barrier.

In all of the embodiments shown in FIGS. 24–29, focusing elements which are concave or convex can be used if desired. Also, all of the embodiments provide structures which can carry a print or photographic image on either or both sides. If a printed image is desired, preferably transparent inks are used. If a photographic image is desired, preferably a print emulsion is used. Instant film is also suitable for use with the present invention. It should also be noted that FIGS. 24–29 illustrate only very small cross-sectional views of the light control material of the present invention merely for ease of illustration. This should be apparent in that each embodiment illustrates only one print dot or image element.

Generally, the distance between the focusing elements and the image being brightness enhanced (i.e., in most cases the thickness of the transparent substrate) will be substantially equal to or less than the size of the print dot or image element. This prevents light from the source which passes through one print dot or image element from being reflected by the focusing elements through a different print dot or image element. The requirement is not a strict one because, if it is not met, only slight variations in the actual color of the image will result at color boundaries which will likely be imperceptible to the human eye. Furthermore, this is only relevant where reflective focusing elements are being used.

Figure 30:
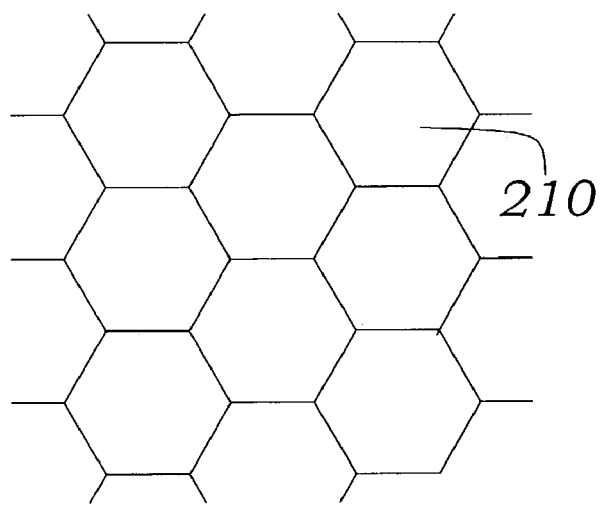
FIG. 30 illustrates a plan view of one embodiment of the focusing elements of the present invention wherein the pattern of the elements is symmetric.

FIG. 30 illustrates a plan view of one embodiment of the focusing elements of the present invention wherein the pattern of focusing elements is symmetric. The pattern of hexagons 210 is periodic over a distance of 60$\mu$ and is also symmetric about the symmetry of the hexagons. The symmetry and periodicity may result in a diffraction pattern which is strongly lobed in a hex star pattern. In order to reduce the diffraction effects, the periodicity of the pattern can be disrupted, as shown in FIG. 31.

FIG. 31 illustrates a plan view of an embodiment of the focusing elements of the present invention wherein the pattern of hexagons 212 has been disrupted by the presence of asymmetric focusing elements 215. The asymmetric focusing elements 215 provide a wider field of view than that provided by the hexagonal focusing elements 212. In addition to reducing diffractive effects, the wider field of view provided by the asymmetric focusing elements 215 provides for a gradual, as opposed to abrupt, change in the enhanced brightness of an image. Disrupting the periodicity of the focusing elements is also useful in eliminating moire banding which may result when the ratio of the period of the focusing elements to the number of print dots remains constant. The periodicity of the focusing elements can also be disrupted by orienting the hexagons 212 in an asymmetric fashion with respect to each other, as shown in FIG. 31.

By varying the center-to-center distance between focusing elements of the same geometry and by varying the orientation of boundary lines of the shapes, the occurrence of parallel boundary lines is minimized. This minimizes constructive interference of light coming from the focusing elements which reduces diffractive effects.

Asymmetric focusing elements can also be used to accomplish different objectives. For example, FIG. 21 illustrates a symmetric pattern of focusing elements created by using asymmetric conical focusing elements. Asymmetric reflectors allow greater control over the field of view than symmetrical reflectors. By providing a symmetrical pattern of asymmetrical reflectors, greater control over the field of view is obtained while providing a uniform field of view for enhancing the brightness of an image. However, diffractive effects may still occur if the center-to-center distance between focusing elements is constant. By creating an asymmetric pattern such as that shown in FIG. 31, diffractive effects can be reduced or eliminated, as discussed above. Although the pattern in FIG. 31 repeats on a periodic basis, the distance between repetitions is great enough with respect to the wavelengths of light provided by a light source to minimize diffractive effects. Furthermore, the pattern provides greater control over the field of view by providing a gradual change in the field of view, as discussed above.

C. Metallized Replicated Microstructures for Absorbing Light

Another embodiment of the present invention provides a metallized replicated microstructure that appears jet black because of strong absorption from multiple reflections and destructive resonances between high aspect ratio tapered shapes, for example tall cones. The metallized replicated microstructure enables the effect of ultra-high resolution, high contrast printing without the use of inks or pigments. The physical dimensions of the individual microstructures are on the order of a wavelength of light, so it is possible to 'print' black pixels at the limit of optical detection. Characters or patterns created using these metallized replicated microstructures are capable of attaining wavelength dimension pixels with maximum contrast.

Metallized replicated microstructures of the present invention can be used to reproduce images, text, bar codes, and data patterns down to micron dimensions and with submicron resolution. As the ultimate resolution microprinting, these structures can be used to write whole sentences across the width of a conventionally micro printed letter 'I'! Thus, metallized replicated microstructures can be used for covert authentication of documents and information.

Neither surface relief nor volume holograms can exhibit true black patterns. Metallized holograms accomplish the function of black through the use of specular surfaces and the function of white from highly diffuse surfaces. The image contrast of a metallized hologram therefore depends on the particulars of the viewing environment: black is relative, not absolute.

Photopolymer 'volume' holograms obtain 'black' from the dyed color of the photopolymer or its backing layer, much like the black on a TV screen is actually the color of the screen when it is turned off. Obtaining a strong black in a photopolymer requires strongly absorbing dyes, but strongly absorbing dyes reduce the brightness of the holographic image. A balance must be found between the need to provide high contrast and the need to provide a bright image. The compromise point is typically to use a dark green dye. Again, a truly black pattern is not normally possible in photopolymer volume holograms.

Another embodiment of the present invention provides a black-and-white image formed in a polymer layer of material by first using photolithographic techniques to expose selected areas in the polymer layer and then reactively ion etching the exposed areas of the polymer layer to form light traps in the selected areas. Color images can also be created by first creating a black-and-white image in a polymer layer and then overlaying the polymer layer with additive or subtractive color transparencies.

Embodiments of the present invention are capable of operating in the reflective or transmissive modes, as discussed in further detail below. In the reflective mode, which is the preferred embodiment, the embossment is coated with a reflective layer of metal. However, it is also possible to use other materials, such as a metallic paint, or any pigment or ink which exhibits specularly reflective properties. In the transmissive mode, it is unnecessary to coat the embossment with a reflective layer of metal. However, when the embossment is intended to operate in the transmissive mode, it is possible to coat only the light traps with a reflective layer of metal in order to enhance their light-absorbing characteristics.

In this embodiment, the micro-optics comprise arcuate-shaped focusing elements that "reimage" the source of the light impinging thereon and provide a minimum field of view which is independent of the angular extent of the source of the light. The overall field of view provided by a particular focusing element is dependent upon the geometry of the focusing element and the angular extent of the light source. By controlling the minimum field of view of the focusing elements, the overall field of view can be controlled. This allows light to be reflected and concentrated over a particular range of viewing angles which in turn allows the black and white or color image to be enhanced over the range of viewing angles.

Figure 32:
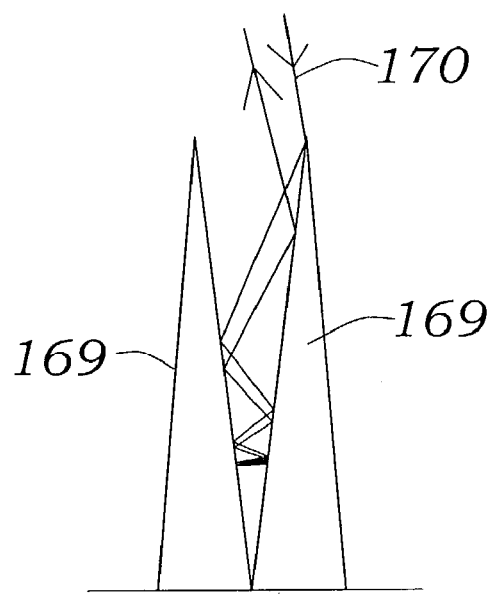
FIG. 32 is a cross-sectional illustration of the tapered structures of the light traps of the present invention.
Figure 33:
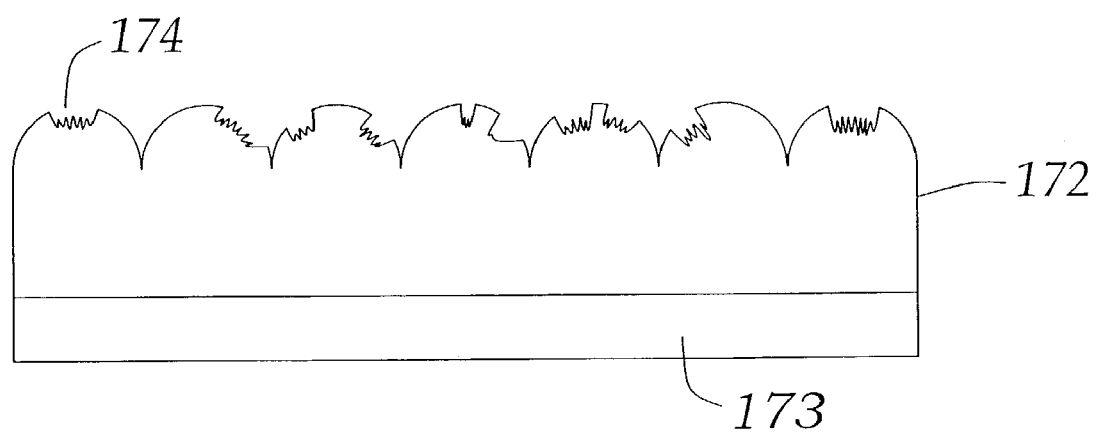
FIG. 33 illustrates a cross-sectional view of the light control material of the present invention in which the light control material has light traps selectively formed therein such that the material displays a black-and-white image.

Each time light which enters the micro-optics containing tapered shapes describe herein is reflected, approximately 10% of the light may be absorbed. Due to the shape of the structures, light is reflected many times before there is a chance for the light to be reflected back out of the light trap. Since approximately 10% of the light may be absorbed each time the light is incident upon the structures, virtually all of the light that enters the light trap is absorbed. FIG. 32 illustrates how the light trap works. As light 170 enters the light trap, it is reflected by the tapered structures 169 until all of the light has been absorbed. Approximately 40% of the light may be absorbed on initial impact. Therefore, it takes very few reflections before substantially all of the light has been absorbed. FIG. 33 illustrates one embodiment for creating a light control material which displays a black-and-white image in accordance with the present invention.

Figure 34:
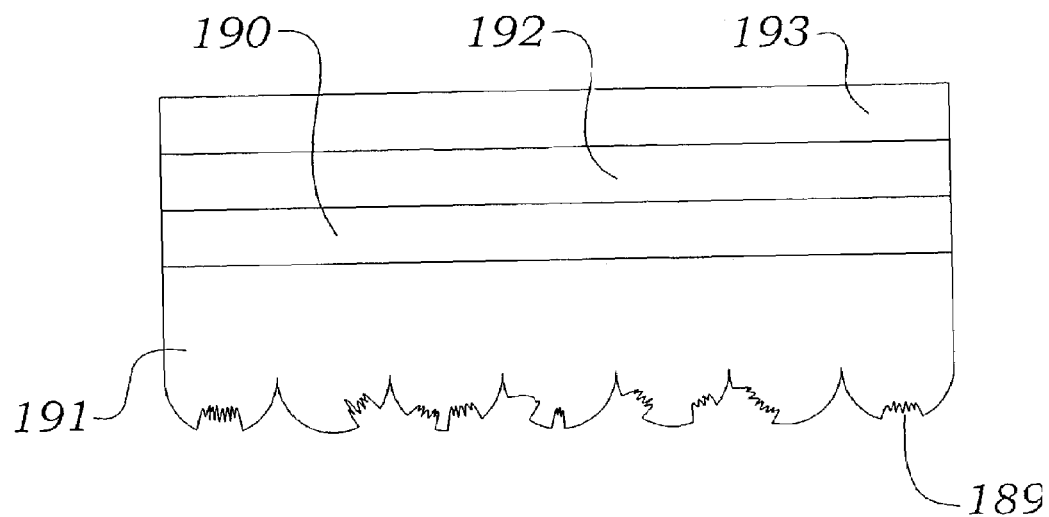
FIG. 34 illustrates a cross-sectional view of the embossed light control material of the present invention which has a black-and-white image formed therein. The black-and-white image is converted into a color image by overlaying the embossment with additive or subtractive color transparencies.

FIG. 34 illustrates an alternative embodiment in which an embossment which displays a black-and-white image can be converted to display a color image. The embossment which carries the black-and-white image can be generated in accordance with any of the embodiments discussed above. The substrate 190 of the embossment can be overlaid with color transparencies 192 and 193 which can be additive or subtractive. The black-and-white image, formed by generating light traps 189 in polymer layer 197, combination with the color transparencies produces a color image.

Figure 35:
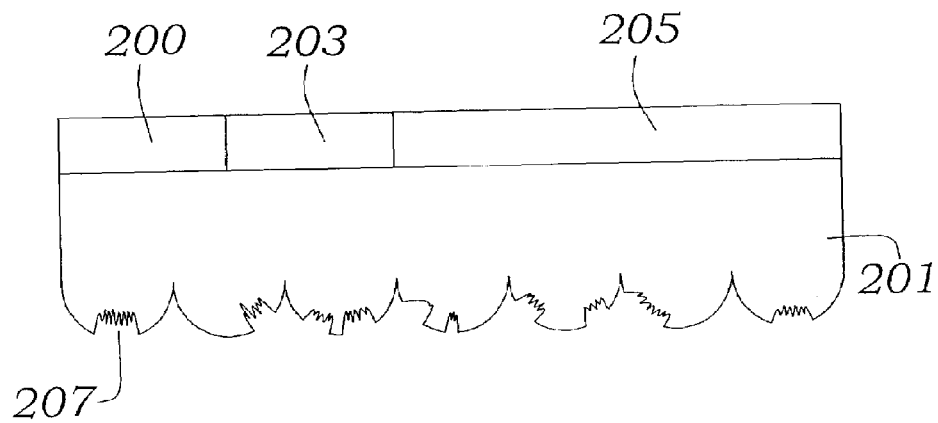
FIG. 35 illustrates an alternative embodiment for converting a black and white image into a color image.

In accordance with the present invention, high resolution black and white images can be created. Generally, the present invention allows a black and white image to be created with a resolution of at least 2000 dots per inch. By overprinting the high resolution black and white image with a low resolution transparent color ink image, a high resolution color image is produced. As shown in FIG. 35, an embossment 201 has a high resolution black and white image formed therein as indicated by light traps 207. The printed color image may be comprised of any color images that can be printed by printers, such as cyan, magenta and yellow, for example The human eye has difficulty perceiving color edges without contrast. In accordance with the present invention, contrast is provided by a high resolution black and white embossed image. When the high resolution black and white embossed image is overprinted with transparent ink, the effect of a high resolution color image is created.

As discussed above, an embossed black and white image can be produced by placing a master which is comprised of a substrate and a cured polymer layer in contact with a layer of liquid photopolymer and exposing the liquid photopolymer to ultraviolet light. Alternatively, a metal embossing master may be created from any of the photopolymer masters by electroforming. For example, the master shown in FIG. 33 may be coated with a thin layer of metal, such as silver, by vapor deposition in order to render it electrically conductive. Electrical contact is then made to the metal surface and a layer of nickel is deposited onto the surface by conventional electroforming processes. After deposition of a sufficient thickness of nickel, the nickel plated photopolymer layer is removed from the electroplating bath and the nickel master is separated form the photopolymer layer. Embossments may then be generated from the nickel master by the soft embossing procedures known in the art and as discussed above.

Figure 36:
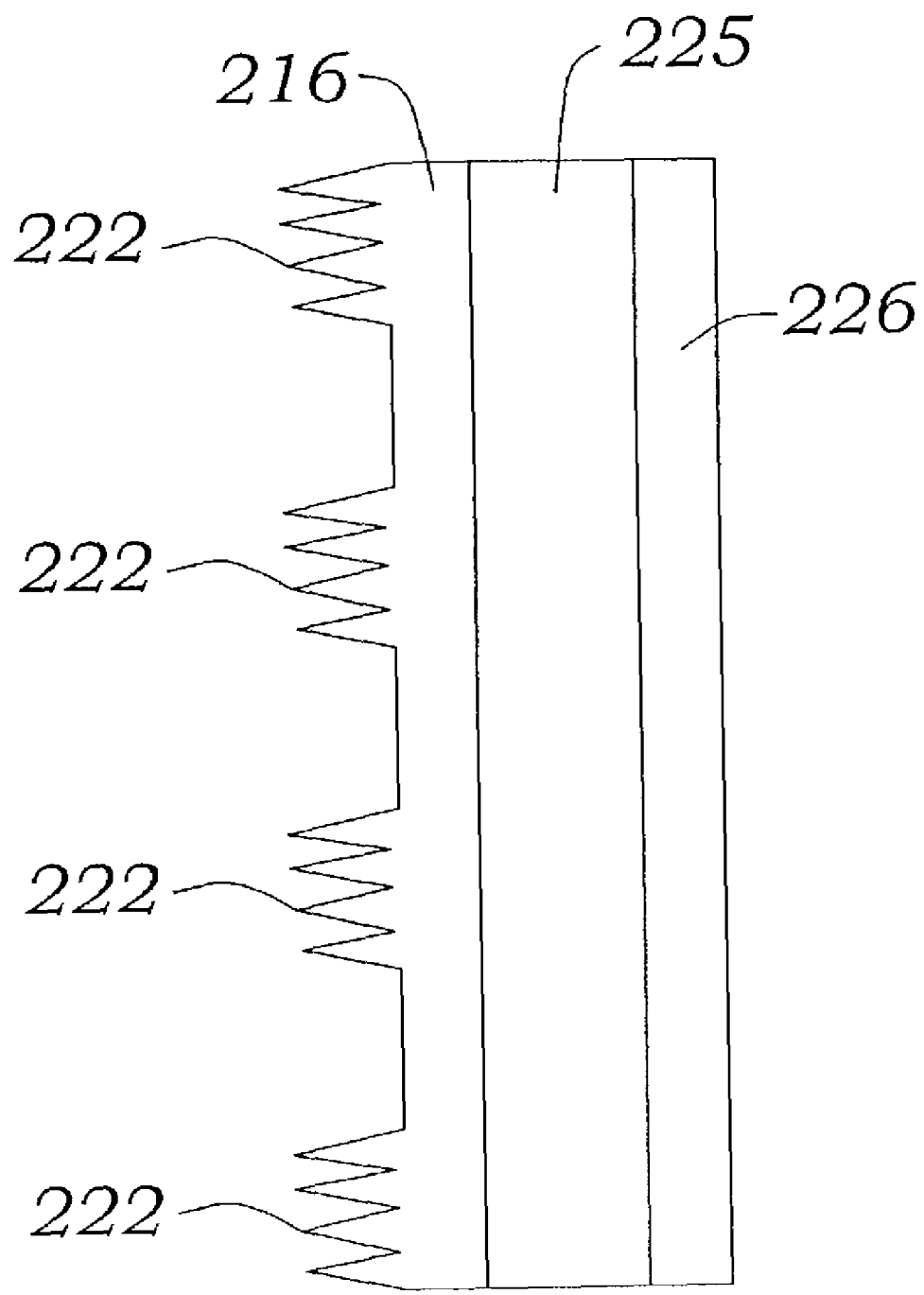
FIG. 36 illustrates a light control material for displaying color images which operates in the transmissive mode.

As shown in FIG. 36, one embodiment of the present invention is capable of operating in the transmissive mode to produce a color image by placing additive or substractive color transparencies 225 and 226 in contact therewith or by overprinting the black and white image with a transparent color ink image. In essence, the structure can be used to produce color images.

NOA 61 photopolymer is an exemplary photopolymer that can be used to create the light control material of the present invention. Although this type of photopolymer was found through experimentation to be suitable for use with the present invention, it is possible that other types of photopolymers may also be suitable for such use. Shipley 1800 Series photoresist is preferably used to create the light control material of the present invention but other types of photoresist may be suitable for use with the present invention.

D. Copyproof and Scanproof Substrates, Images, and Data

Another embodiment of the present invention provides a family of micro-optic systems designed to prevent scanners and copiers from capturing an image. These optical systems incorporated do not allow incident illumination to be reflected in the direction of the imaging optics of the scanner or copier. In effect, the micro-optics system creates a cone of darkness which projects out from the paper in the direction of the imaging system. Regardless of the angle of illumination, light does not get reflected into the imaging system, so no image is formed: the resulting copy or scan is black.

People do not normally read documents by holding them perpendicular to their faces, but more typically by looking at them at an angle of about forty-five degrees. The micro-optic systems disclosed here can be designed so the document appears normally illuminated from this angle. As a result, documents incorporating these micro-optic systems are easily read by people but highly resistant to photocopying and scanning. Thus, one embodiment of the present invention provides a method of reducing image quality of a reproduction by embedding a micro-optic device into a substrate wherein the micro-optic device comprises a reflective surface having an effective radius of curvature causing greater than 50 percent, typically greater than 70 percent of incident light to be reflected away from the vertical axis perpendicular to the substrate. By reflecting light away from the vertical axis perpendicular to the substrate, a majority of light is reflected away from light detection devices of photocopiers or scanners.

The visual appearance of a sheet of the disclosed micro-optics is extraordinary: when viewed from directly perpendicular to its surface it appears to have a large black spot in its center. If the sheet is tilted away the black spot appears to slide down the page and off of it, into space, leaving the page bright and easily read. This unusual visual effect is valuable by itself as a document security device.

The described micro-optics systems can be incorporated into a substrate to provide copy and scan protection for an entire document or it can be applied in smaller regions to provide selective optically variable and non-reproducible effects. The micro-optics can be patterned to display text, bar code, data, or image information which is only visible within the cone of darkness, near normal incidence.

If the micro-optics are overprinted with information in black ink, that information will only be visible outside the cone of darkness but it will be invisible near normal incidence. Combining overprinted text with text incorporated into micro-optics can provide very strong document authentication and copy indication, such as using the overprinted text to display the words "This is an Original Document" at reading angles, while incorporating the words "This is a Copy" in the micro-optics, visible only near normal incidence. A photocopy or scan of the document would only record the latter message, confirming that it is a copy. Off normal information can also be incorporated into the micro-structure. For example, the words "NOT A" can appear off normal as black against a white background, while the word "COPY" can appear at near normal incidence as white on a black background. Viewing and tilting the original document bearing this micro-optic pattern would show the complete sentence "NOT A COPY," but copies and scans would only show the word "COPY."

The shape and extent of the 'cone of darkness' can also be designed to provide an anti-eavesdropping effect. In this case the micro-optics cause the document to appear black from all angles other than the intended reading angle of the user, preventing eavesdropping, photocopying, and scanning.

Because of the inherent limitations of diffractive optics, holograms cannot simulate the optical effect of disclosed microstructures. Holograms do not have illumination angle independence, so they cannot be designed to create a cone of darkness which persists without regard to illumination conditions.

A further embodiment of the micro-structure printable for use in the present invention is a printing substrate that includes a physical base material 100, light absorbing elements 105, and field of view controlling micro-optics 110. The function of the light absorbing elements 105 may be incorporated into the base material 100, for example, by including light absorbing pigmentation in the base material 100. This printing substrate may additionally include a planar zing layer 115 over the optics 110 which may also act as an ink or toner receptor coating, or an additional ink or toner receptor coating 120 may be provided as the outer surface of the assembled substrate. The field of view controlling micro-optics 110 may be partially or completely coated with a thin reflective film 125, preferably vapor deposited aluminum.

It is desirable to provide the field of view controlling micro-optics 110 as an embedded optical system, thereby facilitating the printing of the this substrate in a conventional manner and obviating the need to perform a post-print lamination. Embedded field of view controlling micro-optics can be refractive or reflective. Refractive embedded field of view controlling micro-optics can be formed from a high refractive index material and then overcoated with a lower refractive index material, but it is generally more desirable to provide a reflective micro-optic system instead. An embedded refractive optic system will require a separate manufacturing operation to provide a pattern of light absorbing elements and then a subsequent operation of forming the refractive optical surface in alignment with the patterned light absorbing elements. A reflective micro-optic system can incorporate the light absorbing elements into its structure without requiring an extra manufacturing step and without requiring alignment to another pattern.

In one embodiment of the micro-structure, the optical function of this printing substrate is to significantly reduce the intensity of ambient light reflected into a range of angles which typically center on the normal to the surface of the substrate while providing higher levels of reflected light outside of this dark zone. People typically view a document from about a 45 degree angle, so the visibility of information printed on an micro-optic coated substrate is not impaired for a person to view and read. Document reproduction devices such as photocopiers, scanners, and fax machines view a document with imaging optics that are disposed normal to the plane of the document in order to obtain an undistorted image. By reducing the reflected light intensity in the direction normal to the plane of the document, and micro-optic substrate can degrade the quality of the image obtained by a document reproduction device to a greater or lesser degree. If the reflected light intensity in the normal direction is reduced below a threshhold level particular to an individual document reproduction device, then that device will not be able to form an image of the document and the information on that document will be protected from duplication by that device. If the reflected light intensity in the normal direction is reduced by a sufficient amount, all conventional document reproduction devices can be prevented from forming an image and that document can be considered to be copyproof, scanproof, and faxproof.

Any scene that can be viewed by the human eye can be photographed, so although a micro-optic treated document can be made immune to copying, scanning, and faxing, it can be photographed from those viewing angles that allow light reflection. A photographic image taken from an angle off of normal will be distorted, and would require additional complex processing to eliminate the distortion. It is a primary object of the invention to protect original documents from duplication by interfering with conventional document reproduction methods.

Figure 37:
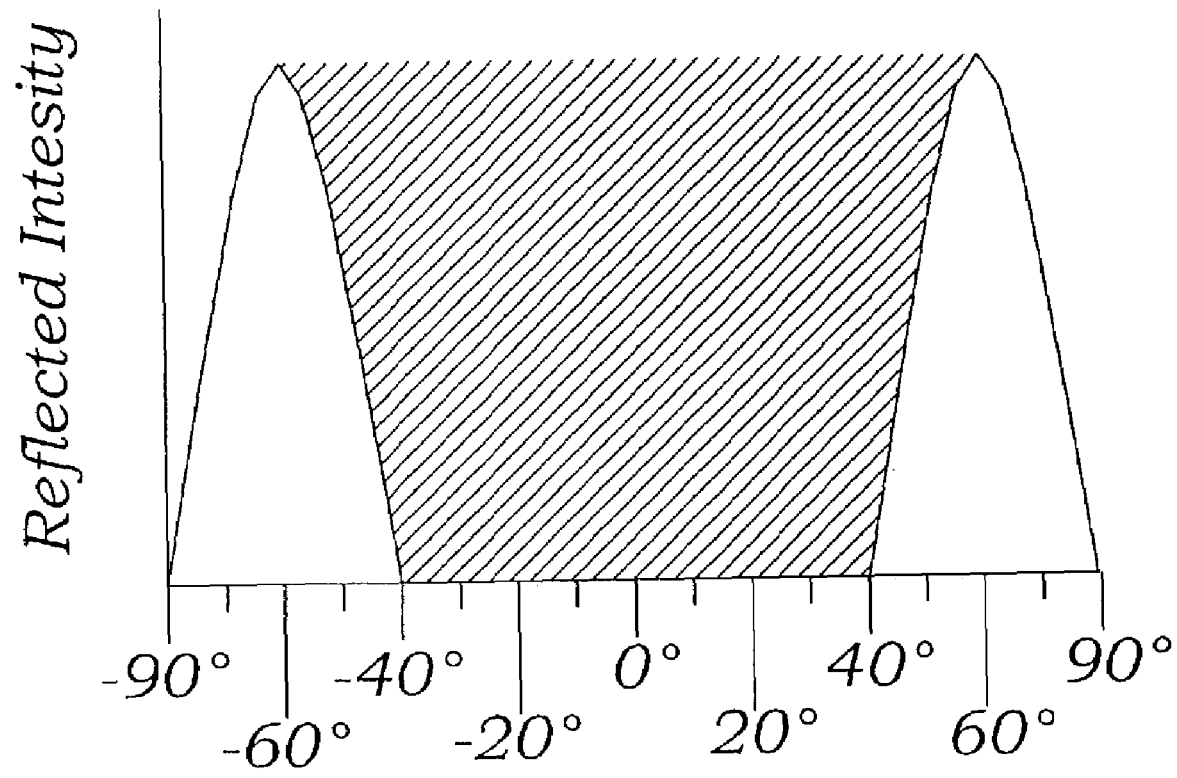
FIG. 37 illustrates a typical reflected light pattern from a micro-optic treated substrate.

FIG. 37 illustrates a typical reflected light pattern from a micro-optic treated substrate. This pattern can be linear, such that the light and dark zones appear as bands across the document, or the pattern can be nonlinear, taking other geometrical forms such as ellipses, hexagons, squares, circles, or patterns incorporating image or text information, such as company logos. The patterns can be caused to repeat across the document or to fill the area of the document with a single instance. The bounding angles of the dark and bright zones shown in FIG. 37 are merely for example; the design of the micro-optic system allows these angles to be chosen to suit the desired application. The pattern of dark and bright zones can be consistent across the micro-optic treated substrate or it can be variable, up to and including zones which may show no bright reflectance from any angle and zones which may show no dark patterns from any angle.

An exemplary micro-optic light and dark pattern to prevent photocopying, scanning, and faxing is a linear dark zone when viewed from a range of angles to either side of normal and bright reflection zones when viewed at angles higher than the dark zone cutoff angles. In between the dark and bright zone angles there is a brightness transition zone having an angular width that depends on the specifics of the micro-optic system employed for field of view control.

When the document is tilted from normal the dark zone appears to "slide off" the document into the space beyond it. When the document is tilted back toward normal the dark zone appears to "slide back on" to it from the space beyond it.

The relative angular widths of the bright and dark zones can be designed to provide illumination of the whole document when viewed in the bright zone or to provide a narrow band of bright illumination that can be scanned up and down the document by tilting it. A narrow bright pattern such as this provides little impediment to a human observer, who can scan the line of illumination up and down the document as needed, while substantially increasing the difficulty of photographing the document, since multiple photographs would be required to completely capture the information content of the document.

An alternate embodiment provides a rotationally symmetric patterning of the bright and dark zones. In this embodiment the dark zone can appear substantially in the form of a circle of chosen diameter. The dark zone can be smaller than the dimensions of the document, it can appear as a multiplicity of circular dark spots, or it can be visually larger than the document so that it fills it entirely when viewed from a selected angle of distances. When the micro-optic treated document made from this substrate is tilted the dark zone(s) will appear to "slide off" and "slide on" to the document in a manner similar to that described above for a linear dark zone.

A unique feature of the micro-optics is that the presence, angular extent, and position of the dark zone is substantially independent of the illumination angle. This degree of light control is not possible for a purely diffractive optical system. These micro-optics are not primarily diffractive, but are rather primarily nonimaging geometrical optics with physical structures and optical separations which provide substantially illumination-angle independent optical function.

Figure 38:
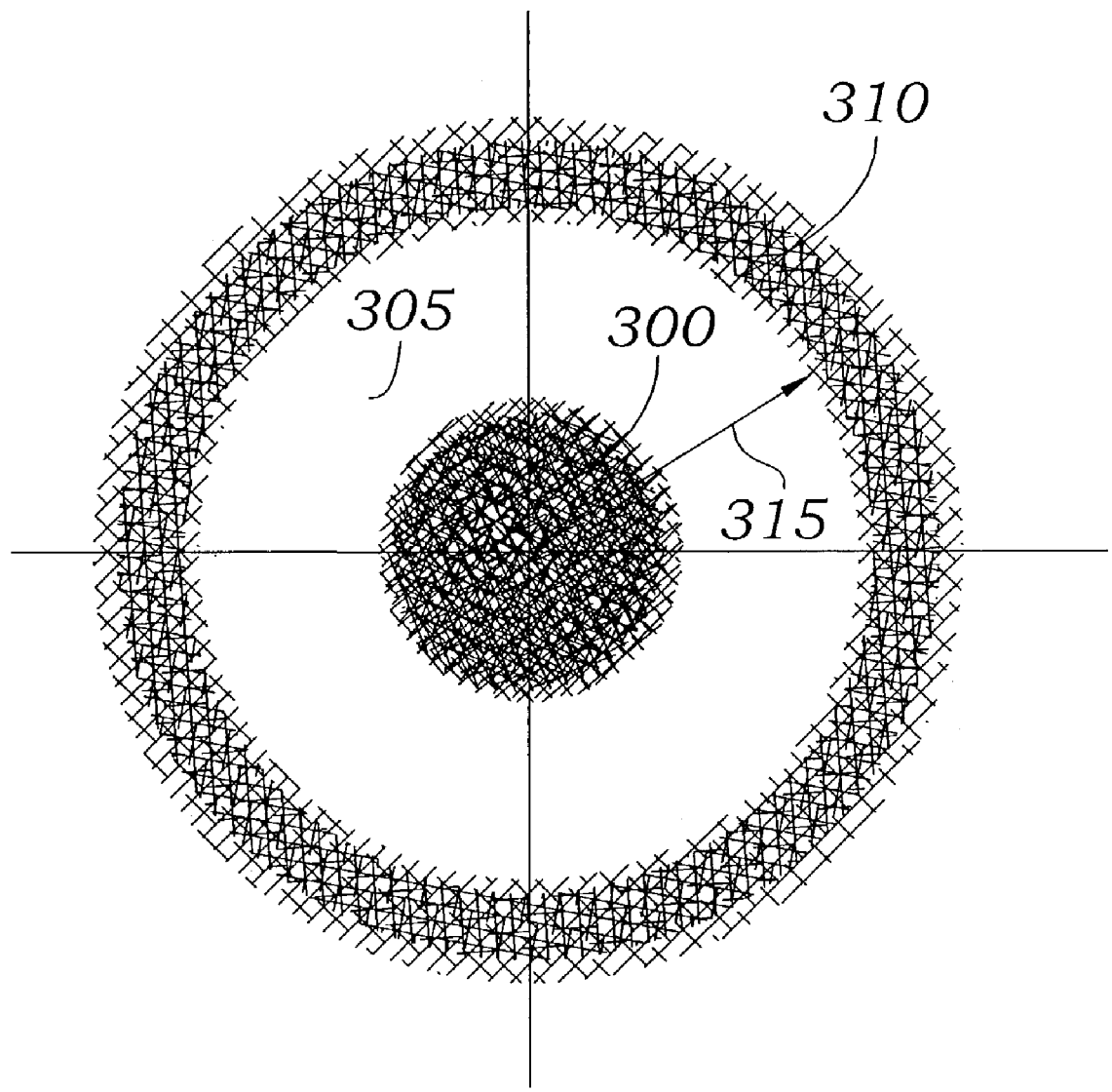
FIG. 38 illustrates the appearance of the relative dark zone and bright zone of one embodiment.

FIG. 38 illustrates the appearance of the relative central dark zone 300 and bright annular zone 305 surrounding the central zone of one embodiment, without reference to the scale of the document. An annular zone of lower brightness 310 surrounds the outer neripheryof the bright zone 305. This figure shows the visual effect of rotationally symmetric bright and dark patterns wherein the radial dimension 315 is the field of view. As described above, the scale of the dark zone can be selected to multiply fill, underfill, or overfill the document for a selected range of viewing distances. This provides an additional measure of control for defeating document reproduction devices.

Figure 39:
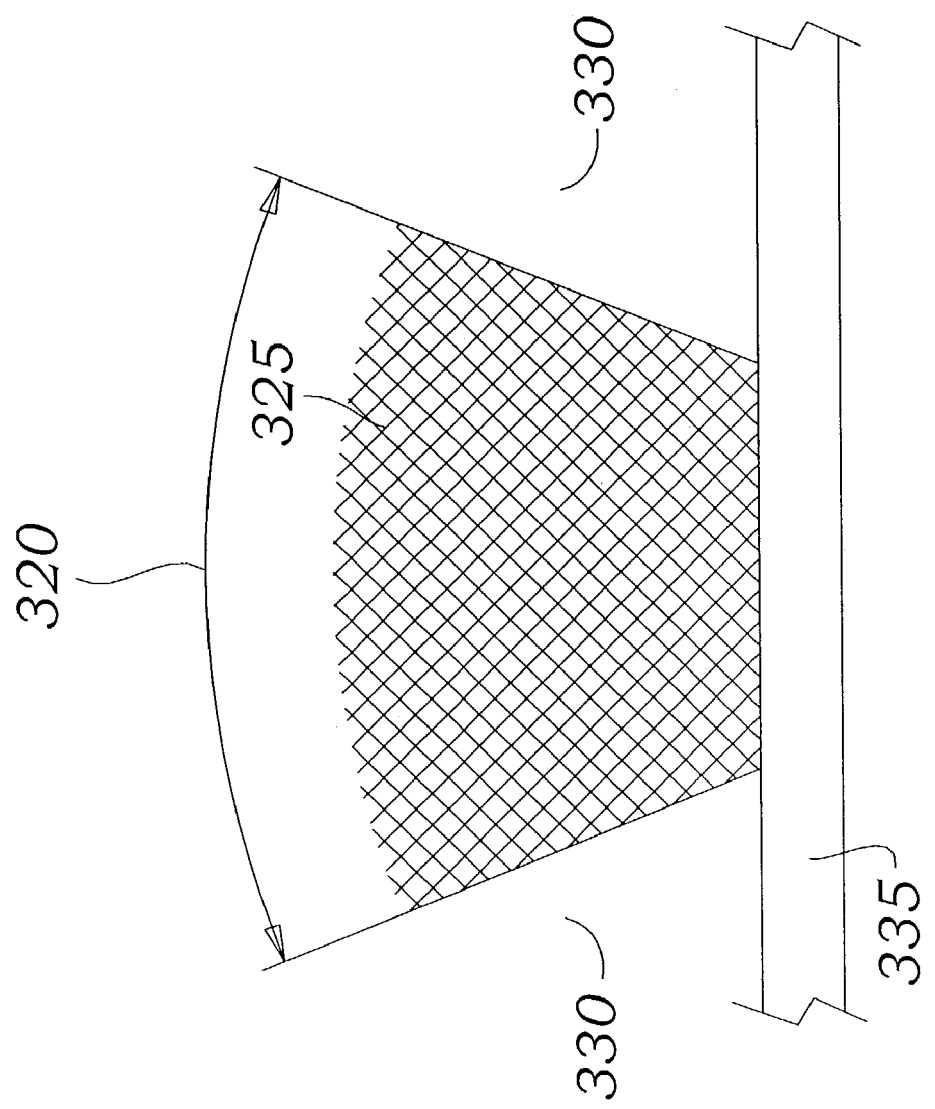
FIG. 39 schematically illustrates a side view of one small region of a micro-optic treated substrate.

FIG. 39 schematically illustrates a side view of one small region of a micro-optic treated substrate 335 of micro-optic film. The dark zone 325 is defined as having a designed angular field of view (FOV) 320. Outside of the dark FOV the treated substrate allows bright light reflection in the bright zones 330. In reality the line dividing the dark zone from the bright zones is not so sharp and distinct as illustrated and there is a transition zone through which the intensity changes from one state to the other.

Figure 40:
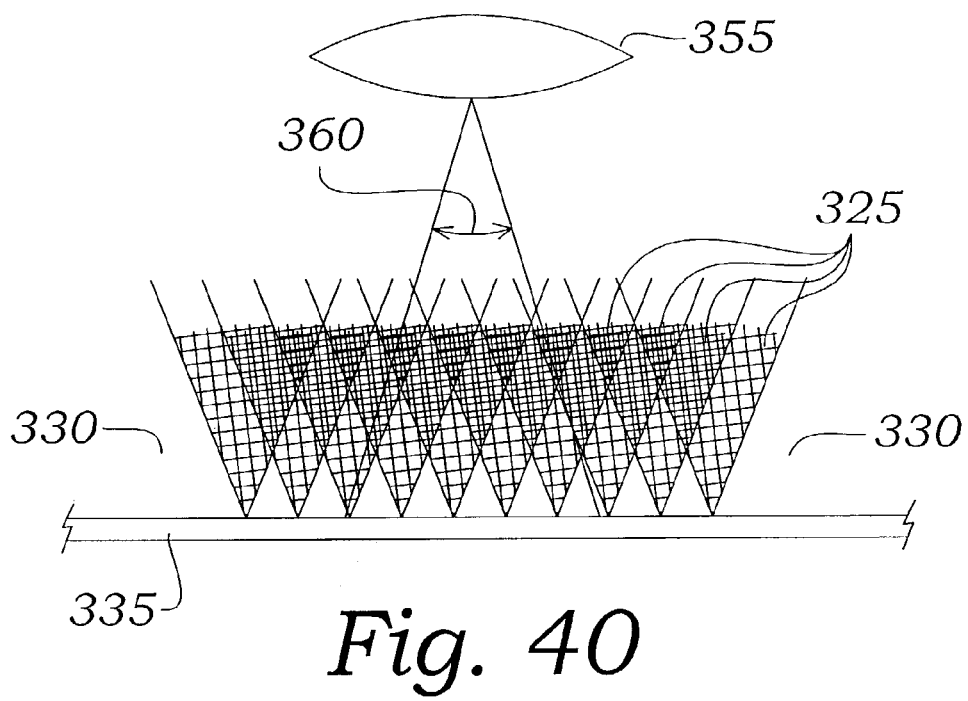
FIG. 40 schematically illustrates a side view of a larger region of an exemplary substrate of the present invention.
Figure 41:
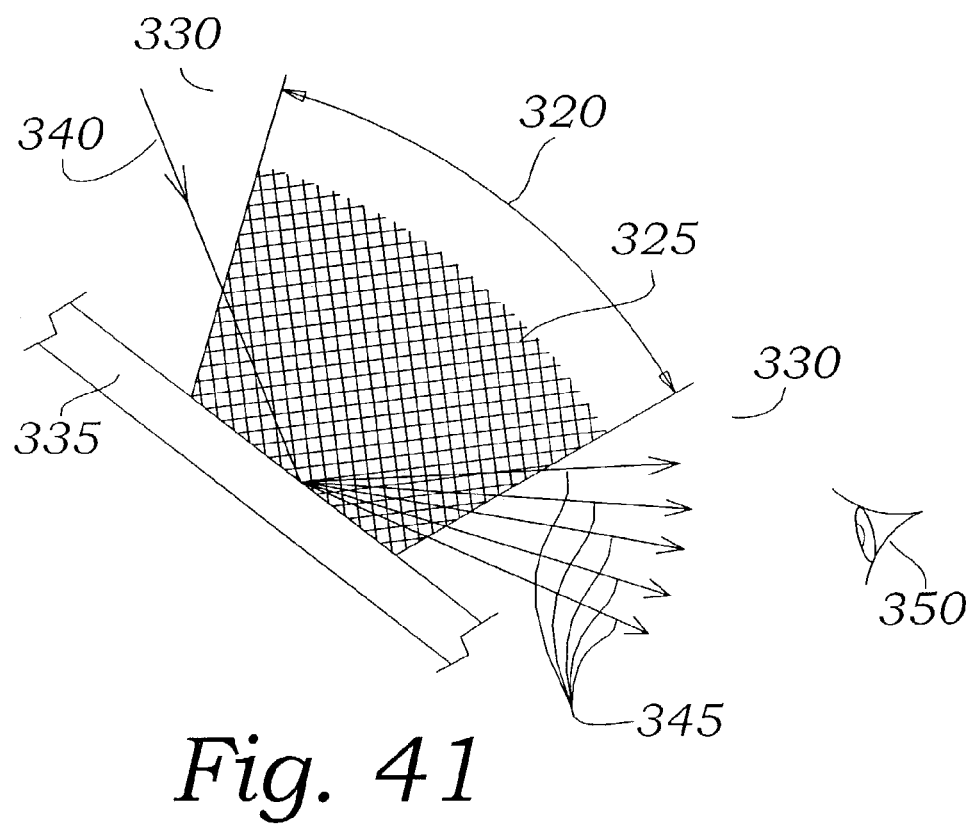
FIG. 41 illustrates the viewing of an exemplary document of another embodiment by a person such that the document is viewed from an angle outside of the dark zone field of view.

FIGS. 40–41 schematically illustrates a side view of a larger region of an exemplary substrate of micro-optic film 335 of the present invention, showing that the overall dark zone is formed by the overlap of a multiplicity of individual dark zones 325 created by the field of view control micro-optics bordered by bright zones 330. So long as the dark zone field of view exceeds the document reproduction device imaging system's filed of view (I.S.F.O.V.) 360, the image formed by imaging optics 355 of the document reproduction device will be degraded across its entirety.

FIG. 41 illustrates the viewing of an exemplary document made from this material by a person 350 such that the document is viewed from an angle outside of the dark zone field of view 320. The light 340 reflected into this bright zone 330 will generally appear to be scattered and non-specular, thereby creating an appearance similar to conventional paper.

Figure 42:
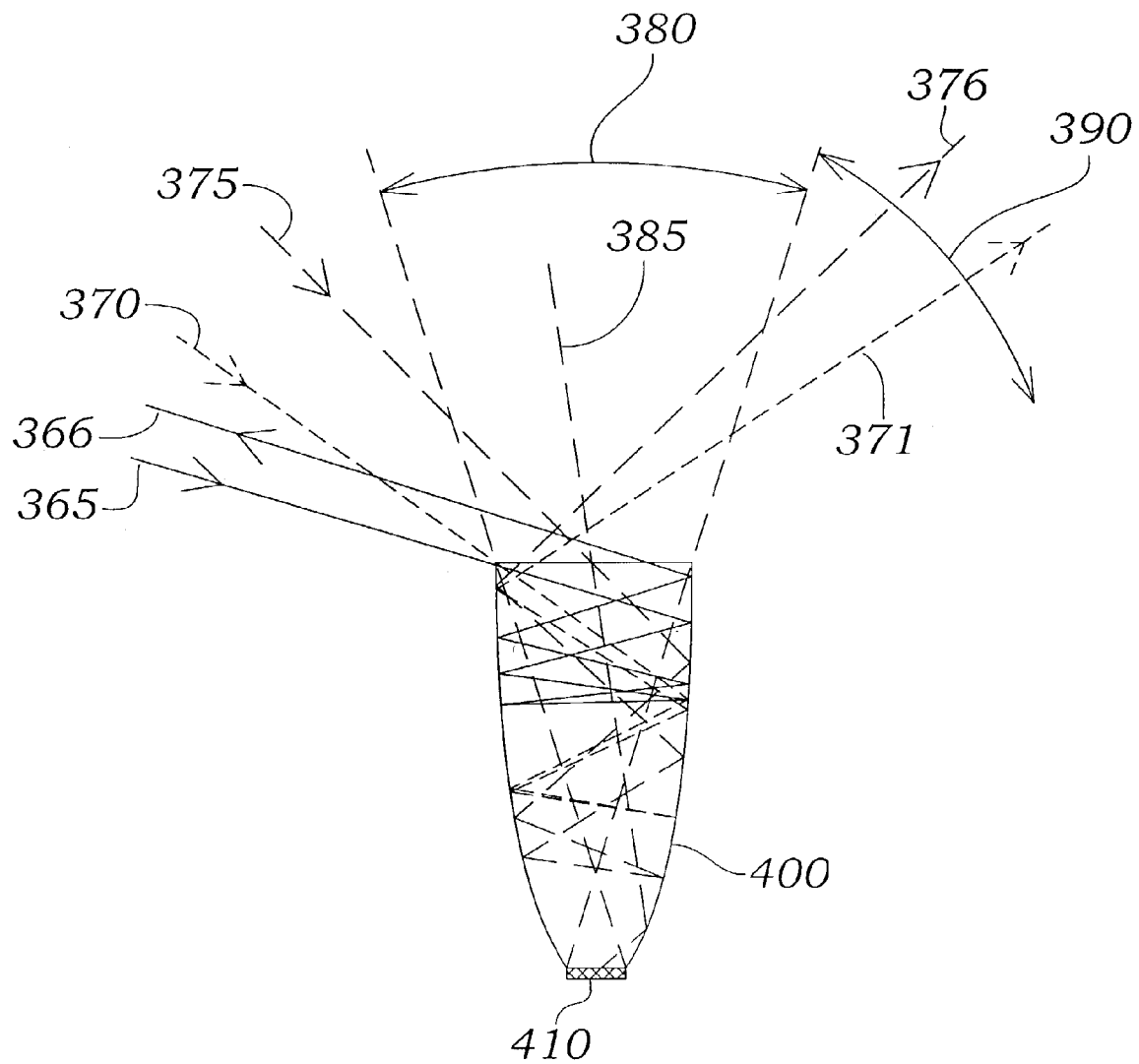
FIG. 42 illustrates the general form of a reflective micro-optic element.

FIG. 42 illustrates the general form of a reflective micro-optic element. The largest dimensions of this micro-optic will typically fall in the range of 10 microns to 200 microns, preferably around 20 to 50 microns. The form of the optic is a cuplike or troughlike reflector 400 which may be imaging or non-imaging, opening toward the upper, printed surface of the substrate and truncated at its opposite end. Disposed near to or coincident with the truncated narrow end of the reflector is a light absorbing pattern creating a black zone 410. This pattern may take the form of a long strip in the case of a troughlike reflector, a circular pattern in the case of a cuplike reflector, or other designed patterns. The reflector sidewalls can take a wide range of geometrical forms including linear (substantially forming a truncated V groove as a trough or the frustrum of a cone as a cuplike structure) a compound parabolic collector (CPC). also known as a Winston collector, a truncated cone, a cylinder, partial paraboloid, hemisphere or other similar shape. It can be linear (2-D) or an object of revolution (3-D). The reflector 400 appears to be black from angles inside the field of view (FOV) because light rays in that space must originate from the black zone 380. Outside of the black FOV light can enter the reflector without being trapped and can, therefore, reflect out 366, 376, 390 to the observer.

For any class of geometrical form there are an infinite number of variations of curvature, aspect ratio, truncation position, symmetry, and black zone geometry which will produce a single or a multiplicity of dark zones and bright zones in the optical flint The general function of all of these optics is similar to non-imaging light concentrators such as compound parabolic reflectors: over one set of viewing angles the reflector surfaces reflect out the light 366 which appears to emanate from the truncated end of the reflector, and over another set of viewing angles the reflector surfaces trap light incident through their larger apertures and scatter it back out trough the larger aperture into another range of angles 390. The presence of the black zone 410 at or near the truncated end of the reflectors limits the light available to be reflected into the first set of viewing angles. It effect, the reflector can only "see" the black zone over the first set of viewing angles. The second set of viewing angles are those which collect the light scattered and reflected from the reflector surfaces at angles where the viewer cannot see a reflection of the dark zone.

Another way to characterize optics having the requisite function is: an imaging or non-imaging reflector that appears to be dark from viewing angles inside of the dark zone field of view 380 because rays arriving in that space must originate from the black zone at the narrow end of the reflector. When viewed from angles outside of the dark field of view the reflector appears brighter because light reflecting into that bright zone traverses the reflector surfaces at angles which do not cause it to be reflected into the black zone and thereby be absorbed. Rays entering the bright zone commonly experience at least two reflections and may experience many more depending on their degree of skew with respect to the reflector axis of symmetry.

Figure 43:
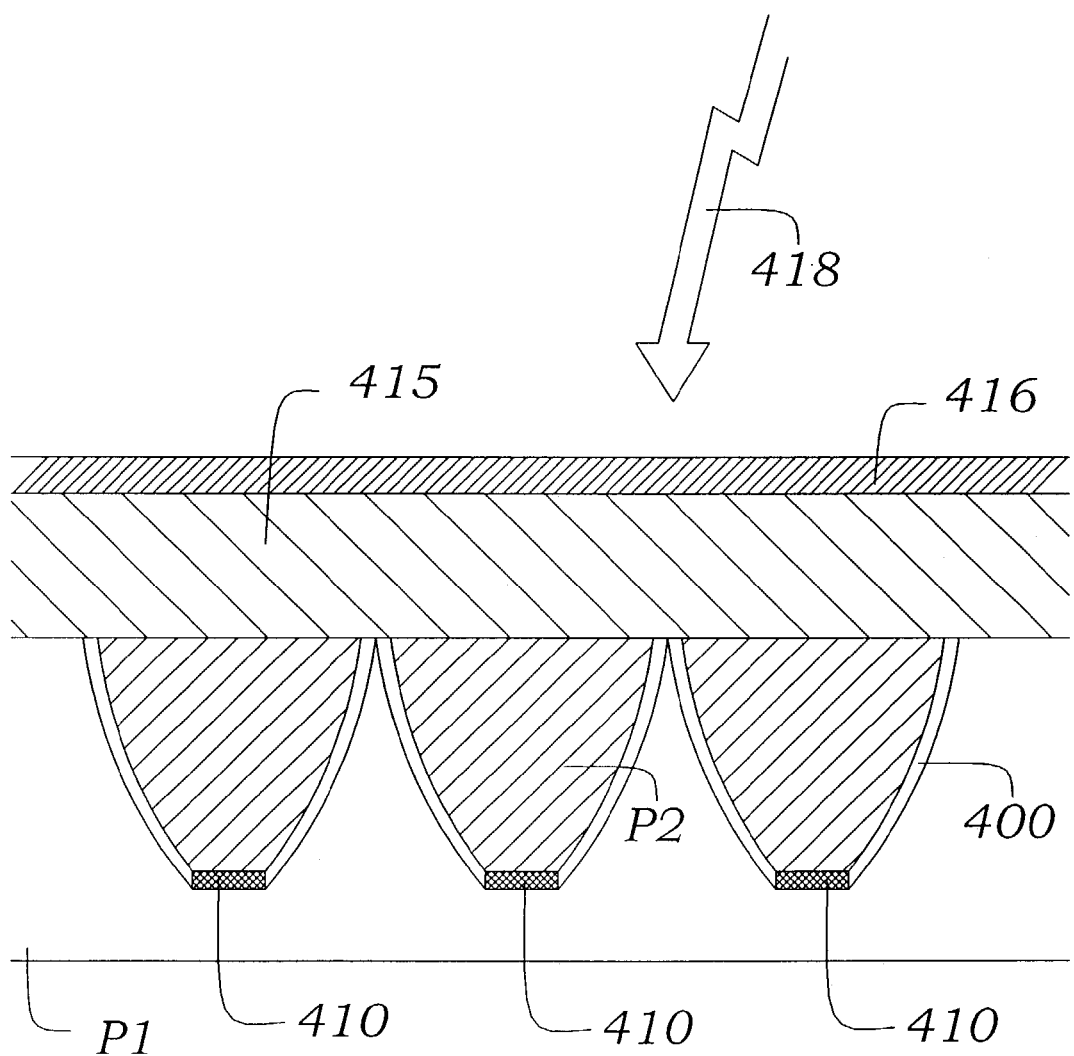
FIG. 43 illustrates a typical optical film structure of an exemplary embodiment.

FIG. 43 illustrates a typical optical film structure of an exemplary embodiment, including an optional physical base material 415, light absorbing elements (black zones) 410, and field of view controlling micro-optics. The function of the light absorbing elements (dark zones) may be incorporated into the base material, for example, by including light absorbing pigmentation in the base material. A printing substrate may additionally include a planarizing layer 416 over the optics, which planarizing layer may also act as an ink or toner receptor coating, or an additional ink or toner receptor coating may be provided as the outer surface of the assembled substrate. The field of view controlling micro-optics, namely teleflector 400, may be partially or completely coated with a thin reflective film preferably vapor deposited aluminum or silver and, optionally, embedded in a polymer material P1. The interior of the field of view controlling micro-optics can be filled with a polymer non-imaging optic P2.

While the invention has been disclosed in preferred forms, it will be apparent to those skilled in the art that many modifications can be made to the invention without departing from the spirit and scope of the invention. For example, the present invention is not limited with respect to the types of materials used to create the masters or embossments. Any materials which have the desired physical and optical properties may be used with the present invention. The embossments may also be generated by extrusion embossing wherein a molten extrudate is placed in contact with the master. When the extrudate cools it hardens and the resulting embossment is separated from the master.

We claim:

1. A micro-optically labelled article having a surface including a micro-optic structure to display identifying optical information,
    said micro-optic structure comprising
    a plurality of image elements; and
    a light control material having a first and a second surface, the first surface having a plurality of light focusing elements, and the second surface including light control optics having dark zones and bright zones arranged in a predetermined pattern, wherein the micro-optic structure displays said optical information using a combination of geometrical optics and diffractive optics.

2. A micro-optically labelled article having a surface including a micro-optic structure to display identifying optical information,
    said micro-optic structure comprising
    a plurality of image elements; and
    a light control material having a first and a second surface, the first surface having a plurality of light focusing elements, and the second surface including light control optics having dark zones and bright zones arranged in a predetermined pattern, wherein said micro-optic structures comprises
    a polymer having the first and the second surface;
    wherein the first surface comprises a plurality of cylindrical lenses; and
    wherein the second surface comprises a curved reflective surface and a light absorbing surface.

3. The article of claim 2, wherein the micro-optic system forms a textual image within said polymer.

4. The article of claim 2, wherein the micro-optics form an identifying image.

5. The article of claim 4, wherein the identifying image comprises graphics.

6. The article of claim 5, wherein the identifying image is multicolored.

7. A micro-optically labeled article comprising:
    a surface having a plurality of micro-optic structures positioned in a specified pattern to display identifying optical information wherein at least one of said micro-optic structures comprises
    a plurality of tapered structures wherein said tapered structures are covered with a reflective material such that light is reflected among the tapered structures until substantially all of the reflected light has been absorbed.

8. A micro-optically labeled article comprising:
    a surface having a plurality of micro-optic structures positioned in a specified pattern to display identifying optical information wherein the plurality of micro-optic structures comprises
    reflective optical elements having an effective radius of curvature to reflect light into a specified viewing area; and
    a plurality of tapered structures wherein said tapered structures are covered with a reflective material such that light is reflected among the tapered structures until substantially all of the reflected light has been absorbed.

9. The article of claim 8, wherein the reflective optical elements reflect light into a specific field of view.

10. The article of claim 8, wherein light incident to reflective optical elements is reflected at an oblique angle.

11. The article of claim 8, wherein the tapered structures absorb light from multiple reflections.

12. A micro-optically labelled article comprising:
a surface having a micro-optic structures to display identifying optical information,
wherein said micro-optic structures comprises a polymer having a first and a second surface, said first surface having a plurality of lenses, and said second surface having a curved reflective surface and a light absorbing surface, and
wherein the light absorbing surface comprises high aspect ratio tapered structures that create destructive optical resonances between the tapered structures resulting in a dark image display.

13. A method for identifying an original article, the method comprising:
applying a micro-optic structure to or incorporating it within a surface of the original article, wherein in response to illumination the micro-optic structure forms an identifying image independent of illumination angle containing identifying information in relation to the original article, wherein the micro-optic structure comprises:
a polymer having a first and a second surface;
wherein said first surface comprises a plurality of cylindrical lenses; and
wherein said second surface comprises a curved reflective surface and a light absorbing surface.

14. The method of claim 13, wherein the micro-optic structure controls light using a combination of geometrical optics and diffractive optics.

15. The method of claim 13, wherein the micro-optic structures have a surface relief greater than a micron.

16. The method of claim 13, wherein the curved reflective surface forms an image beneath the first surface.

17. The method of claim 13, wherein the second surface is coated with a reflective material.

18. The method of claim 17, wherein the reflective material comprises a metal.

19. The method of claim 13, wherein the light absorbing surface absorbs light from multiple reflections.

20. The method of claim 13, wherein the absorbing surface comprises high aspect ratio tapered structures that create destructive optical resonances between the tapered structures resulting in a black image display.

21. The method of claim 13, wherein the micro-optic system forms a textual image within said polymer.

22. The method of claim 13, wherein the original article is a document.

23. The method of claim 13, wherein the identifying image comprises text.

24. The method of claim 13, wherein the identifying image comprises graphics.

25. The method of claim 13, wherein the identifying image is multicolored.

26. A method for identifying an original article, the method comprising:
applying a micro-optic structure to or incorporating it within a surface of the original article, wherein in response to illumination the micro-optic structure forms an identifying image independent of illumination angle containing identifying information in relation to the original article wherein light incident to the polymer is reflected at an oblique angle.

27. The method of claim 26, wherein the micro-optic system reflects specific bandwidths.

28. A method of reducing image quality of a reproduction comprising
embedding a micro-optic device into a substrate wherein the micro-optic device comprises a reflective surface having an effective radius of curvature causing greater than 50 percent of incident light to be reflected away from the vertical axis perpendicular to the substrate.

29. The method of claim 28, wherein the light is reflected away from the vertical axis perpendicular to the substrate independent of the angle of incidence.

30. A micro-optically labelled article having a surface including a micro-optic structure to display identifying optical information,
said micro-optic structures comprising
a plurality of image elements; and
a light control material having a first and a second surface,
the first surface having a plurality of light focusing elements, and
the second surface including light control optics having dark zones and bright zones arranged in a predetermined pattern, the plurality of light focusing elements and the light control optics cooperating to form the identifying optical information from the plurality of image elements that can be viewed independent of illumination angle.

31. The article of claim 30, wherein at said micro-optic structure does not contain a pigment.

32. The article of claim 30, wherein said optical information is selected from the group consisting of an image, text, number, symbol, bar code and graphic information.

33. The article of claim 30, wherein said micro-optic structure has a surface relief greater than a micron.

34. The article of claim 30, wherein the displayed optical information identifies the article as an original article.

35. The article of claim 30, wherein the bright zones of the second surface include
reflective optical elements having an effective radius of curvature to reflect light into a specified viewing area.

36. The article of claim 30, wherein the micro-optic system reflects specific bandwidths.

37. The article of claim 30, wherein the article is a document.

38. The light control material of claim 30, wherein the microstructures are structures less than 200 $\mu$m in width and comprise micro-optics selected from the group consisting of geometrical optics, diffractive optics, and a combination thereof to form an image when illuminated.

39. The article of claim 30, wherein the bright zones are comprised of light transmissive material.

40. The article of claim 30, wherein the light control optics include a reflective layer for reflecting light at the bright zones.

41. The article of claim 30, wherein the dark zones are formed from an opaque material on or in the second surface.

42. The article of claim 30, wherein the dark zones are formed from high aspect ratio tapered structures that create destructive optical resonances between the tapered structures resulting in a dark image display.

43. The article of claim 30, wherein the light forming elements are cylindrical lenses.

44. The article of claim 30, wherein the light focusing elements are selected from the group consisting of refractive cylindrical lenses, diffractive lenses, hybrid refractive/diffractive cylindrical lenses and reflective focusing troughs, and combinations thereof.

45. The article of claim 30, wherein the bright zones have a period that matches a period of the focusing elements.

46. The article of claim 30, wherein the light control material is formed into sets including left, center and right image zones.

47. A method for identifying an original article, the method comprising:

applying a micro-optic structure to or incorporating it within a surface of the original article, wherein in response to illumination the micro-optic structure forms an identifying image independent of illumination angle containing identifying information in relation to the original article, the micro-optic structure comprising:

a plurality of image elements; and a light control material having a first surface and a second surface, the first surface having a plurality of light focusing elements, and the second surface including light control optics having dark zones and bright zones arranged in a predetermined pattern.

* * * * *